(12) United States Patent
Hart et al.

(10) Patent No.: US 11,269,076 B2
(45) Date of Patent: Mar. 8, 2022

(54) SOLID STATE LIDAR MACHINE VISION FOR POWER EQUIPMENT DEVICE

(71) Applicant: MTD PRODUCTS INC, Valley City, OH (US)

(72) Inventors: Charles Hart, Valley City, OH (US); Jeff Kucera, Medina, OH (US)

(73) Assignee: MTD PRODUCTS INC, Valley City, OH (US)

( * ) Notice: Subject to any disclaimer, the term of this patent is extended or adjusted under 35 U.S.C. 154(b) by 42 days.

(21) Appl. No.: 16/509,097

(22) Filed: Jul. 11, 2019

(65) Prior Publication Data
US 2021/0011170 A1    Jan. 14, 2021

(51) Int. Cl.
| G01S 17/931 | (2020.01) |
| G01S 7/481 | (2006.01) |
| G05D 1/00 | (2006.01) |
| G05D 1/02 | (2020.01) |

(52) U.S. Cl.
CPC .......... *G01S 17/931* (2020.01); *G01S 7/4813* (2013.01); *G05D 1/0088* (2013.01); *G05D 1/0231* (2013.01); *G05D 2201/0208* (2013.01)

(58) Field of Classification Search
CPC .................................................... G01S 17/931
See application file for complete search history.

(56) References Cited

U.S. PATENT DOCUMENTS

| 5,805,275 | A * | 9/1998 | Taylor | G01S 7/497 356/3.16 |
| 8,065,486 | B2 * | 11/2011 | Fujisawa | G06F 12/0895 711/128 |
| 10,222,474 | B1 * | 3/2019 | Raring | F21V 29/70 |
| 2005/0134440 | A1 * | 6/2005 | Breed | G01S 17/931 340/435 |
| 2009/0235057 | A1 * | 9/2009 | Fujisawa | G06F 12/0895 712/220 |
| 2012/0185134 | A1 * | 7/2012 | Preston | G06F 11/2035 701/45 |
| 2013/0226344 | A1 | 8/2013 | Wong et al. | |
| 2014/0088761 | A1 * | 3/2014 | Shamlian | G05D 1/0242 700/253 |

(Continued)

OTHER PUBLICATIONS

Camargo, Andrea, S., et al., Infrared to visible frequency upconversion temperature sensor based on Er3C-doped PLZT transparent ceramics, Solid State Communications 137 (2006).*

(Continued)

*Primary Examiner* — Jean Paul Cass
(74) *Attorney, Agent, or Firm* — Wegman Hessler

(57) ABSTRACT

A machine vision device is provided usable in conjunction with power equipment machines. By way of example, an array of sensors can be deployed to detect proximity of objects to the power equipment machine, and issue an alert in response to detecting an object within a threshold distance. The alert can be utilized by the power equipment machine to take corrective action to mitigate or avoid running over or striking the object. Sensors having respective fields of view can be arranged along an arc to facilitate machine vision of a spatial volume in a proximity of the machine, and ranging determinations can be coupled with low cost processing devices to facilitate a machine vision solution far more cost effective than other technologies in the art.

15 Claims, 16 Drawing Sheets

SOLID STATE OPTICAL SENSORS ARRANGED ALONG AN ARC
100

(56) References Cited

U.S. PATENT DOCUMENTS

| | | | | |
|---|---|---|---|---|
| 2016/0025855 | A1* | 1/2016 | Camarri | G01S 17/08 |
| | | | | 250/206.1 |
| 2017/0076606 | A1* | 3/2017 | Gupta | B60Q 9/008 |
| 2017/0249839 | A1* | 8/2017 | Becker | H04W 4/90 |
| 2018/0143324 | A1* | 5/2018 | Keilaf | G01S 7/497 |
| 2018/0284268 | A1* | 10/2018 | McWhirter | G01S 17/10 |
| 2019/0154801 | A1 | 5/2019 | Gani | |
| 2019/0306284 | A1* | 10/2019 | Fu | G01S 7/4802 |
| 2019/0369241 | A1* | 12/2019 | Chen | G02B 7/287 |
| 2020/0284883 | A1* | 9/2020 | Ferreira | G01S 7/4816 |

OTHER PUBLICATIONS

Komlosi, Istvan, Motion Planning for Multiple Robots Using Time Scaling, Department of Control Engineering, and Information Technology, Budapest University of Technology and Economics, (11).*
International Search Report and Written Opinion for International Application No. PCT/US2020/041823 dated Oct. 13, 2020.

* cited by examiner

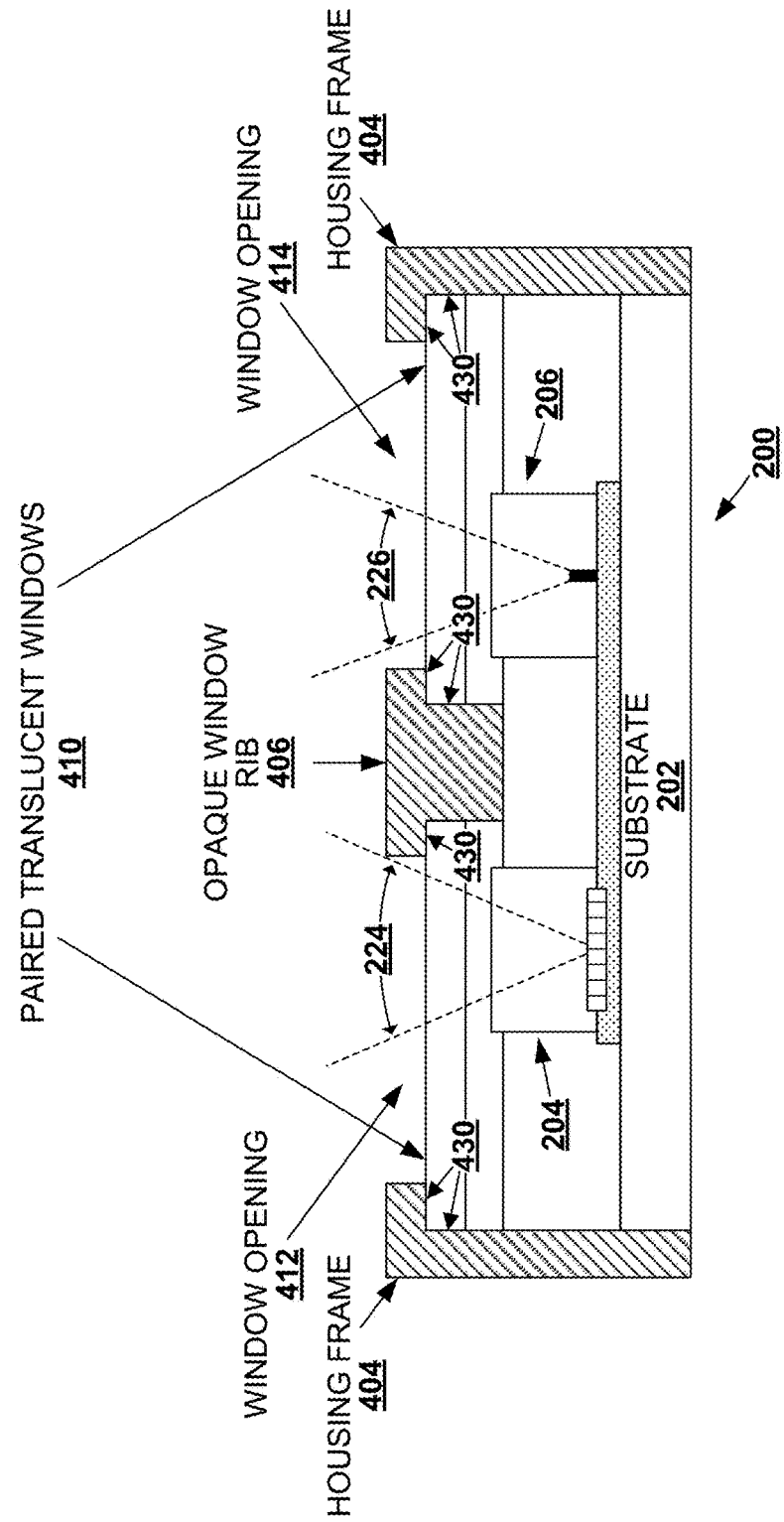

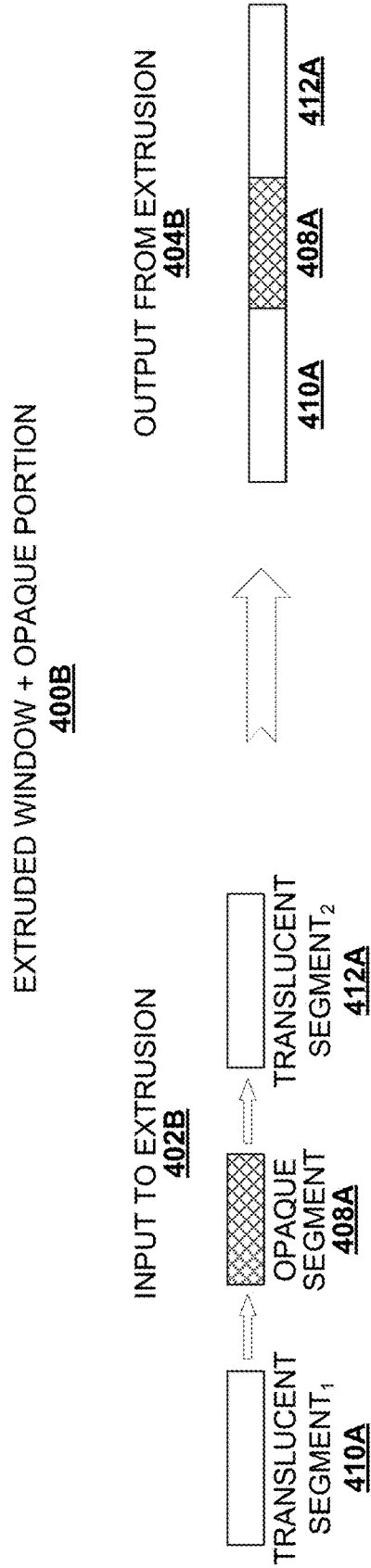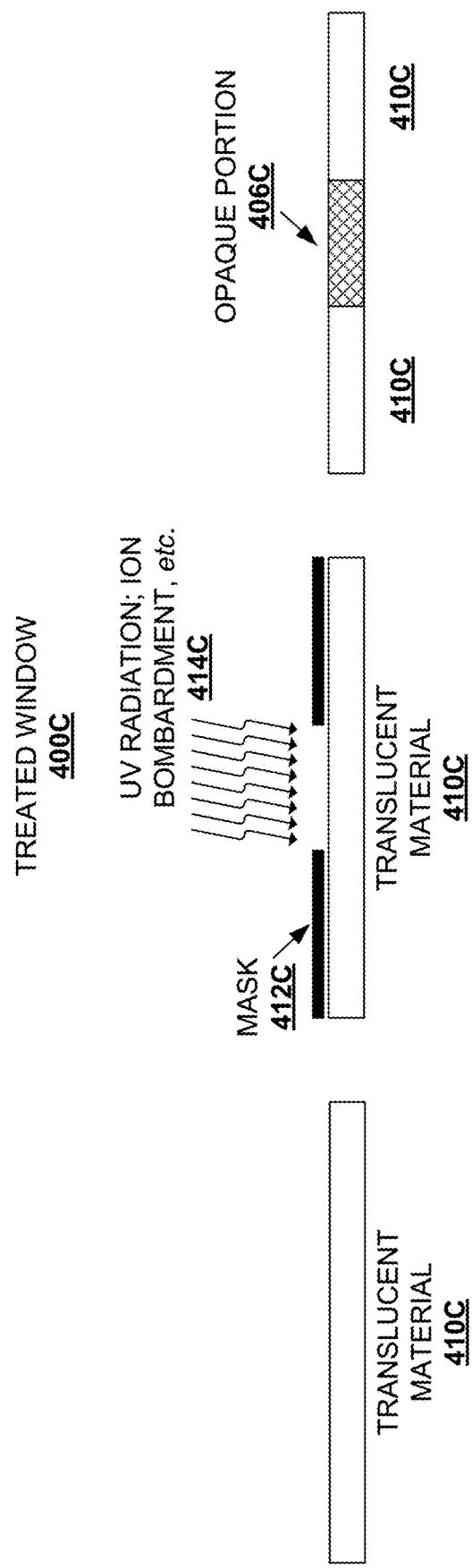

SOLID STATE LIDAR MACHINE VISION
FOR POWER EQUIPMENT DEVICE

FIELD OF DISCLOSURE

The disclosed subject matter pertains to apparatuses and methods for calibrating power equipment, for instance, generating adjustment data for power equipment utilizing objective data of equipment output.

BACKGROUND

Manufacturers of power equipment for outdoor maintenance applications offer many types of machines for general maintenance and mowing applications. Generally, these machines can have a variety of forms depending on application, from general urban or suburban lawn maintenance, rural farm and field maintenance, to specialty applications. Even specialty applications can vary significantly, from sporting events requiring moderately precise turf, such as soccer fields or baseball outfields, to events requiring very high-precision surfaces such as golf course greens, tennis courts and the like.

Professional turf managers spend significant time developing familiarity with the operating capabilities of the power equipment used to manage turf, particularly for specialty applications. Capabilities of these machines enable high quality turf maintenance, but can be very complex to understand and operate in a manner that consistently achieves high quality results. Further complicating matters is the effect of dynamic environmental conditions and weather. Different climates, seasons and weather can add further variance to the performance of outdoor power equipment. Significant experience is therefore generally required to successfully maintain high precision turf for multiple applications, in various climates and at differing times of the year.

BRIEF SUMMARY

The following presents a simplified summary in order to provide a basic understanding of some aspects of the disclosure. This summary is not an extensive overview of the disclosure. It is not intended to identify key/critical elements or to delineate the scope of the disclosure. Its sole purpose is to present some concepts of the disclosure in a simplified form as a prelude to the more detailed description that is presented later.

Disclosed in various embodiments provided herein is an electronic device for machine vision. The electronic device can comprise a group of sensors arranged along a two dimensional or three-dimensional curvature with respective fields of view, and configured to detect existence of an object in any of the fields of view. Detection of an object can be utilized as an input to a power equipment device to initiate a safety response. The safety response can comprise triggering an audio, visual or tactical alert (e.g., to an operator of the power equipment device), issuing a speed reduction signal (e.g., to an automated drive control unit of the power equipment device), issue a stop movement signal or issue a stop blade signal (e.g., to an automated blade motor control unit of a power equipment mowing device), or the like.

In some embodiments, a disclosed electronic device for machine vision can employ a set of solid-state light detection and ranging (LIDAR) sensors to implement machine vision. The LIDAR sensors can employ a projected infrared frequency adapted to use in an outdoor environment, coupled with a sensor adapted to detect reflection of the projected infrared frequency from an object within a field of view of the sensor. The LIDAR sensors are arranged along an arc (in a two-dimensional context) or along a surface (in a three-dimensional context) to facilitate robotic viewing of a volume of space in physical vicinity of a power equipment device. In an embodiment, the LIDAR sensors can be selected to generate ranging data with a reporting frequency sufficient to identify objects in a timeframe for adjusting, slowing, stopping, etc., a power equipment device in response to detection of an object. The reporting frequency can also be selected to be operable with a moderate speed microprocessor with orders of magnitude lower cost to manufacture than modern state of the art microprocessors. Accordingly, embodiments of the present disclosure provide machine vision devices adapted to the physical characteristics of modern power equipment devices, at far lower price points than existing machine vision technologies.

In a further embodiment, the present disclosure provides a machine vision device operable in conjunction with a power equipment machine. The machine vision device can comprise a plurality of infrared sensors arranged in an arc approximately along a two dimensional or three-dimensional surface, an infrared sensor of the plurality of infrared sensors adapted to detect presence of an object within a field of view of the infrared sensor. Further, the machine vision device can comprise at least one microprocessor configured to receive ranging data indicative of identified objects within respective fields of view of the plurality of infrared sensors, determine whether the ranging data identifies an object within a threshold distance from the machine vision device. In one or more additional embodiments, the machine vision device can comprise a housing for enclosing the plurality of infrared sensors and the at least one microprocessor, the housing having a paired window opening against which the infrared sensor is seated. According to particular embodiments, the paired window opening can comprise an opaque rib positioned near a center of the paired window opening and positioned between an infrared emitter of the infrared sensor and a receiver array of the infrared sensor and flush to an active surface of the infrared emitter. Still further, the machine vision device can comprise a pair of translucent windows secured within the paired window opening of the housing at opposing sides of the opaque rib and flush to the active surface of the infrared emitter, the pair of translucent windows providing physical protection for the infrared sensor and translucent to an operating frequency of the infrared sensor. The machine vision device can additionally comprise a communication interface adapted to couple with an electronic control system of the power equipment machine, wherein the at least one microprocessor is configured to output an alert signal to the electronic control system of the power equipment machine in response to detecting the object within the threshold distance.

In further embodiments, disclosed is a method for providing machine vision functionality for a power equipment machine. The method can comprise initializing sensor devices of a machine vision machine, receiving ranging data from the sensor devices and defining a subset of the sensor devices within a direction of movement of the power equipment machine. Still further, the method can comprise receiving ranging data indicative of an object within a maximum range of the sensor devices. In various embodiments, the method can also comprise determining whether the object is within a field of view of the subset of the sensor devices within the direction of movement of the power equipment machine and determining from the ranging data whether the object is within a primary threshold distance associated with the direction of movement of the power equipment machine. In alternative or additional embodiments, the method can comprise outputting a signal alert to a computer control of the power equipment machine in response to the object being within the field of view of the subset of the sensor devices within the direction of movement and in response to determining the object is within the primary threshold distance.

To accomplish the foregoing and related ends, certain illustrative aspects of the disclosure are described herein in connection with the following description and the drawings. These aspects are indicative, however, of but a few of the various ways in which the principles of the disclosure can be employed and the subject disclosure is intended to include all such aspects and their equivalents. Other advantages and features of the disclosure will become apparent from the following detailed description of the disclosure when considered in conjunction with the drawings.

BRIEF DESCRIPTION OF THE DRAWINGS

FIG. 4 illustrates a block diagram of a sample housing and cover window structure for disclosed sensor devices, in an embodiment.

FIGS. 4B and 4C illustrate example mechanisms for forming the sample window structure of FIG. 4A, in one or more other embodiments.

Figure 1:
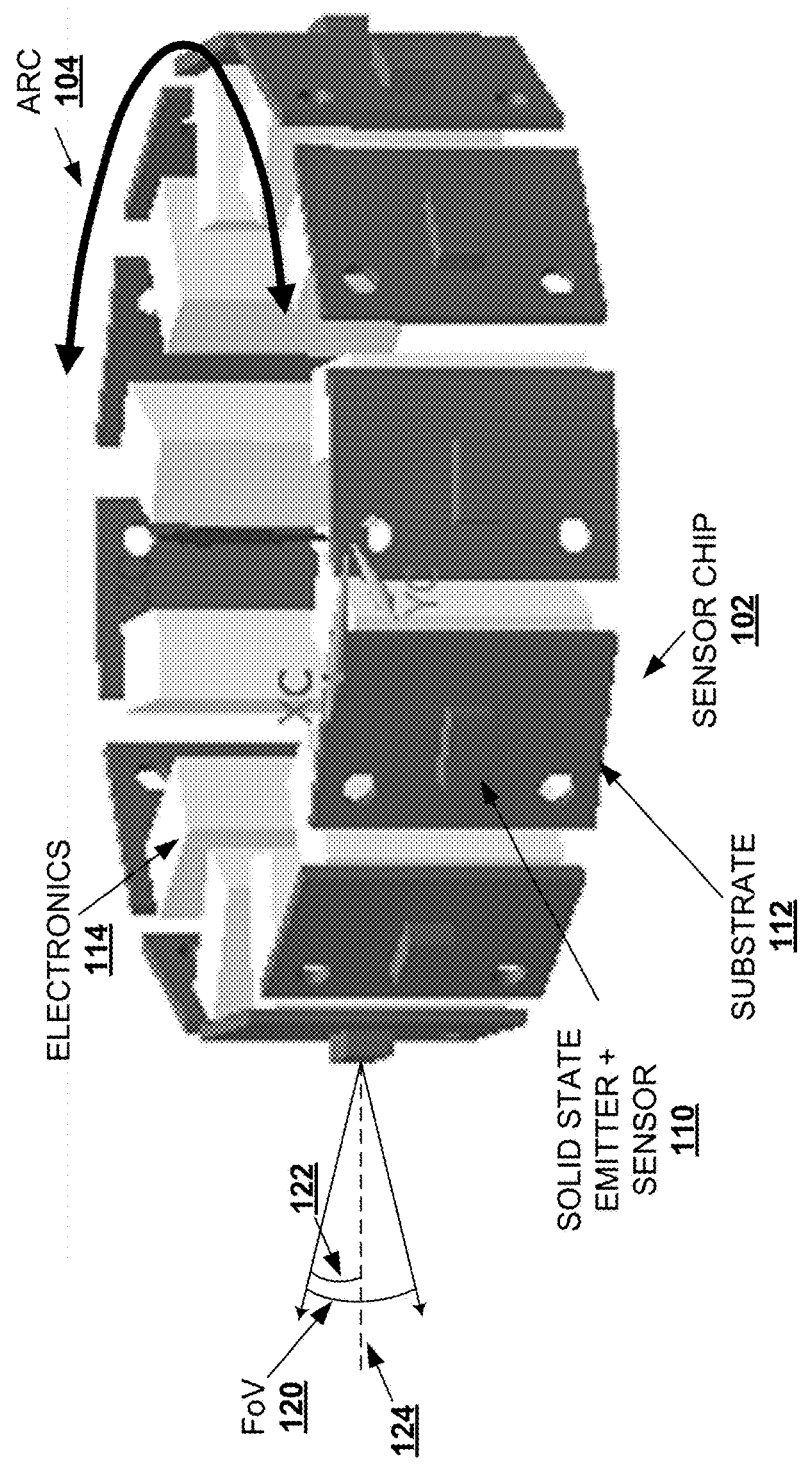
FIG. 1 depicts a block diagram of an example solid state machine vision device for a power equipment machine, in disclosed embodiments.

It should be noted that the drawings are diagrammatic and not drawn to scale. Relative dimensions and proportions of parts of the figures have been shown exaggerated or reduced in size for the sake of clarity and convenience in the drawings. The same reference numbers are generally used to refer to corresponding or similar features in the different embodiments, except where clear from context that same reference numbers refer to disparate features. Accordingly, the drawings and description are to be regarded as illustrative in nature and not as restrictive.

While embodiments of the disclosure pertaining to machine vision systems for power equipment machines are described herein, it should be understood that the disclosed machines, electronic and computing devices and methods are not so limited and modifications may be made without departing from the scope of the present disclosure. The scope of the systems, methods, and electronic and computing devices for machine vision devices are defined by the appended claims, and all devices, processes, and methods that come within the meaning of the claims, either literally or by equivalence, are intended to be embraced therein.

DETAILED DESCRIPTION

The following terms are used throughout the description, the definitions of which are provided herein to assist in understanding various aspects of the subject disclosure.

As used in this application, the terms "outdoor power equipment", "outdoor power equipment machine", "power equipment", "maintenance machine" and "power equipment machine" are used interchangeably and are intended to refer to any of robotic, ride-on, walk-behind, sulky equipped, autonomous, remote control, or multi-function variants of any of the following: powered carts and wheel barrows, lawn mowers, lawn and garden tractors, lawn trimmers, lawn edgers, lawn and leaf blowers or sweepers, hedge trimmers, pruners, loppers, chainsaws, rakes, pole saws, tillers, cultivators, aerators, log splitters, post hole diggers, trenchers, stump grinders, snow throwers (or any other snow or ice cleaning or clearing implements), lawn, wood and leaf shredders and chippers, lawn and/or leaf vacuums, pressure washers, lawn equipment, garden equipment, driveway sprayers and spreaders, and sports field marking equipment.

FIG. 1 illustrates a diagram of an example set of solid-state optical sensors 100 arranged along an arc, according to one or more embodiments of the present disclosure. Solid state optical sensors 100 include a series of sensor chips 102 arranged along arc 104. Sensor chips 102 are configured to identify objects within their respective fields of view, facilitating machine vision in a volumetric space defined by the aggregate of the fields of view along arc 104, to a maximum distance of sensor chips 102 (e.g., see FIGS. 3 and 9, infra).

In the example depicted by FIG. 1, arc 104 covers a full revolution in two-dimensional space, and can be circular in shape (or approximately circular, not having a true mathematically geometric shape), ovoid in shape (or approximately ovoid, not having a true mathematical geometric shape), or other suitable contour or surface having a full revolution in two-dimensional space. In alternative embodiments, though not explicitly illustrated, arc 104 can cover a portion of a revolution that is less than a full revolution. For example, in the context of a circle (or approximation of a circle), arc 104 can cover less than a 360-degree revolution (e.g., 45-degree arc, 90-degree arc, 135-degree arc, 180-degree arc, and so on, or any suitable value there between). Similarly, arc 104 can cover a portion of a revolution of an ovoid shape (or approximately ovoid shape) or other suitable contours or surfaces. In still other embodiments of the present disclosure, solid state optical sensors can be arranged along a different two dimensional or even a three-dimensional shape, such as the surface of: a ball, a sphere, an ovoid solid, or other three-dimensional shape (e.g., see FIG. 6, infra).

In the embodiment depicted by FIG. 1, sensor chips 102 include a solid-state emitter and sensor 110 positioned on a substrate 112. Electronics 114 provide electrical power to each solid-state emitter and sensor 110, as well as a control interface for programming operation of solid-state emitter and sensor 110, and data interface for providing data to, and receiving data from solid state emitter and sensor 110.

In at least some embodiments, sensor chip 102 can be a time-of-flight (ToF) proximity and ranging sensor, for instance as provided by ST Microelectronics FlightSense™ technology (although the subject disclosure is not limited to this technology or manufacturer). In some of these embodiments, sensor chip 102 can be an ST Microelectronics model VL53L1X long distance ranging ToF sensor with up to 4-meter (m) range and ranging frequency up to 50 Hz (or programmed to a frequency within a range of about 40 Hz to about 60 Hz, as one example). The present disclosure is not limited to these embodiments, however, as other suitable proximity sensors, imaging sensors or similar technology (e.g., radar technology, light detection and ranging (LIDAR) technology, light emitting diode detection and ranging (LEDDAR) technology, ultrasound technology, and so on) known in the art, subsequently developed, or reasonably conveyed to one of ordinary skill in the art by way of the context provided herein, can be utilized for sensor chips 102.

Each solid-state emitter and sensor 110 includes a field of view (FoV) 120. The FoV defines a three-dimensional spatial volume in which solid state emitter and sensor 110 can detect presence and distance of an object from a particular sensor chip 102. The three-dimensional spatial volume can be a rotation of FoV 120 about a center axis 124, in some embodiments, with a half-field of view 122 about center axis 124. In other embodiments, the three dimensional spatial volume can be a solid angle defined by a wedge of a solid subtending an arc equal to the field of view along a first axis perpendicular to the center axis 124 (e.g., x axis), and subtending a second arc equal to the field of view or approximately the field of view along a second axis perpendicular to the center axis 124 (e.g., z axis), and having a depth equal to the ranging distance of solid state emitter and sensor 110. In still other embodiments, the spatial volume in which solid state emitter and sensor 110 can detect presence and distance of an object can be a suitable combination of the foregoing, or other definition of spatial volume suitable to a particular technology of solid-state emitter and sensor 110 chosen for sensor chip 102.

Based on implementation, FoV 120 can be aligned so that center axis 124 is at an angle perpendicular to the ground (not depicted), or can be aligned at a different angle relative to the ground. As utilized herein, ground could include any suitable surface upon which a power equipment machine can rest, be supported (e.g., against gravity) or operate. Ground can include natural earth, dirt, clay, rock, stone, or the like, as well as manufactured surfaces such as flooring, constructed surfaces, and so forth, or any suitable combination of the foregoing.

By adjusting orientation of center axis 124 with respect to the ground, the spatial volume detected by sensor chips 102 can be adjusted (e.g., directed, redirected, etc.) for a given implementation. For instance, in some embodiments, center axis 124 can be pointed below an angle perpendicular to ground, to view a spatial volume that extends to a larger proportion below arc 124 than above arc 124. This can be effective for identifying distance of objects for a power equipment machine operating on the ground, such as a mowing equipment machine, among others (e.g., see FIGS. 7 and 8, infra). In still other embodiments, center axis 124 can be directed above the perpendicular to ground, to view a spatial volume that extends to a larger proportion above arc 124 than below arc 124, or other suitable orientations.

Figure 2:
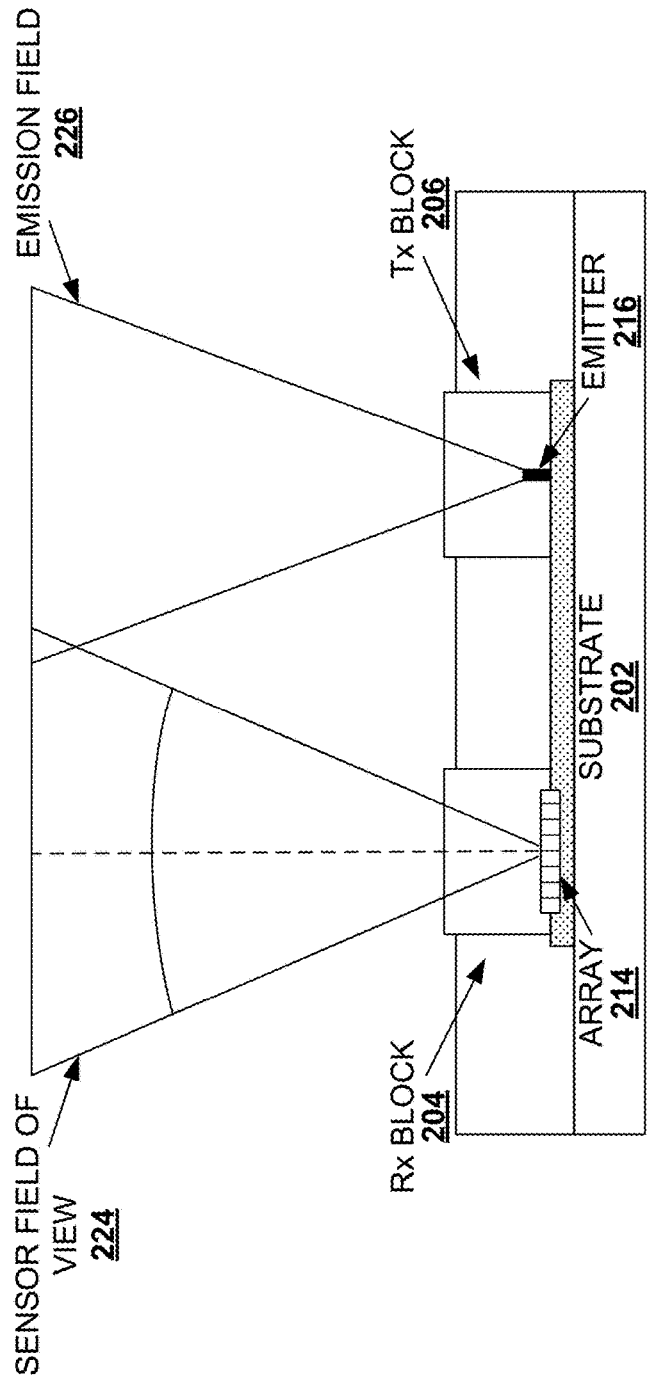
FIG. 2 illustrates a block diagram of an example sensor device for machine vision devices disclosed in one or more embodiments herein.

FIG. 2 depicts a diagram of an example solid state ToF sensor 200 according to one or more embodiments of the present disclosure. ToF sensor 200 can comprise a substrate 202 having an active surface with a receive (Rx) block 204 and a transmit (Tx) block 206. The Rx block 204 includes a receive array 214 having a sensor FoV 224 that defines a spatial volume over which sensor array 214 can detect presence of an object and output distance data indicative of a distance from the object to sensor array 214. The distance data can have values related to the distance by a predefined function. The function can be a linear proportion, a non-linear function, a quadratic function, or any suitable mathematical relationship between the value and the distance, or other suitable relationship between the value and the distance.

Further, Tx block 206 includes an emitter 216 that emits electromagnetic energy in an emission field 226. Emitter 216 can irradiate the object with the electromagnetic energy, and reflections of the electromagnetic energy back toward the active surface of substrate 202 are received by sensor array 214. In some embodiments, solid state ToF sensor 200 can measure a time between emission of the electromagnetic energy by emitter 216 and detection of reflected electromagnetic energy by sensor array 214 (using the speed of electromagnetic energy) to generate the distance data that is related to the distance of the object from sensor array 214. In other embodiments, solid state ToF sensor 200 can measure a time of flight of a periodic signal or code embedded by Tx block 206 within the electromagnetic energy of emission field 226 to generate the distance data, in which the periodic signal or code has a frequency smaller than a frequency of the electromagnetic energy (e.g., one hundredth the frequency of the electromagnetic energy, one thousandth the frequency, one hundred thousandth the frequency of the electromagnetic energy, or any other suitable fraction thereof). Further, periodic emissions and detections of the electromagnetic energy (or periodic signal/code) can be utilized to update the distance data of the object over time. Thus, solid state ToF sensor 200 can facilitate tracking movement of the object in terms of its proximity to sensor array 214 over time, by subsequent emission, detection and generation of the distance data over time.

In various embodiments, a rate at which sensor array 214 emits, detects and generates distinct instances of distance data can be defined as a ranging frequency of solid state ToF sensor 200. With different words, the term ranging frequency refers to a frequency that solid state ToF sensor 200 outputs measurement data pertaining to sensor field of view 224, and can be synonymous with reporting frequency, output frequency, measurement frequency, and the like. The ranging frequency can be about 50 Hz in some embodiments (e.g., ~50 instances of distance data per second). In further embodiments, the ranging frequency can be programmed to be more or less than 50 Hz. For example, the ranging frequency of ToF sensor 200 can be programmed to a value selected in a range from between about 30 Hz and about 70 Hz, or a range from between about 40 Hz and about 60 Hz, or the like. In further embodiments, sensor FoV 224 can be selected from a group consisting essentially of: greater than about 20 degrees, greater than about 25 degrees, and about 27 degrees.

Figure 3:
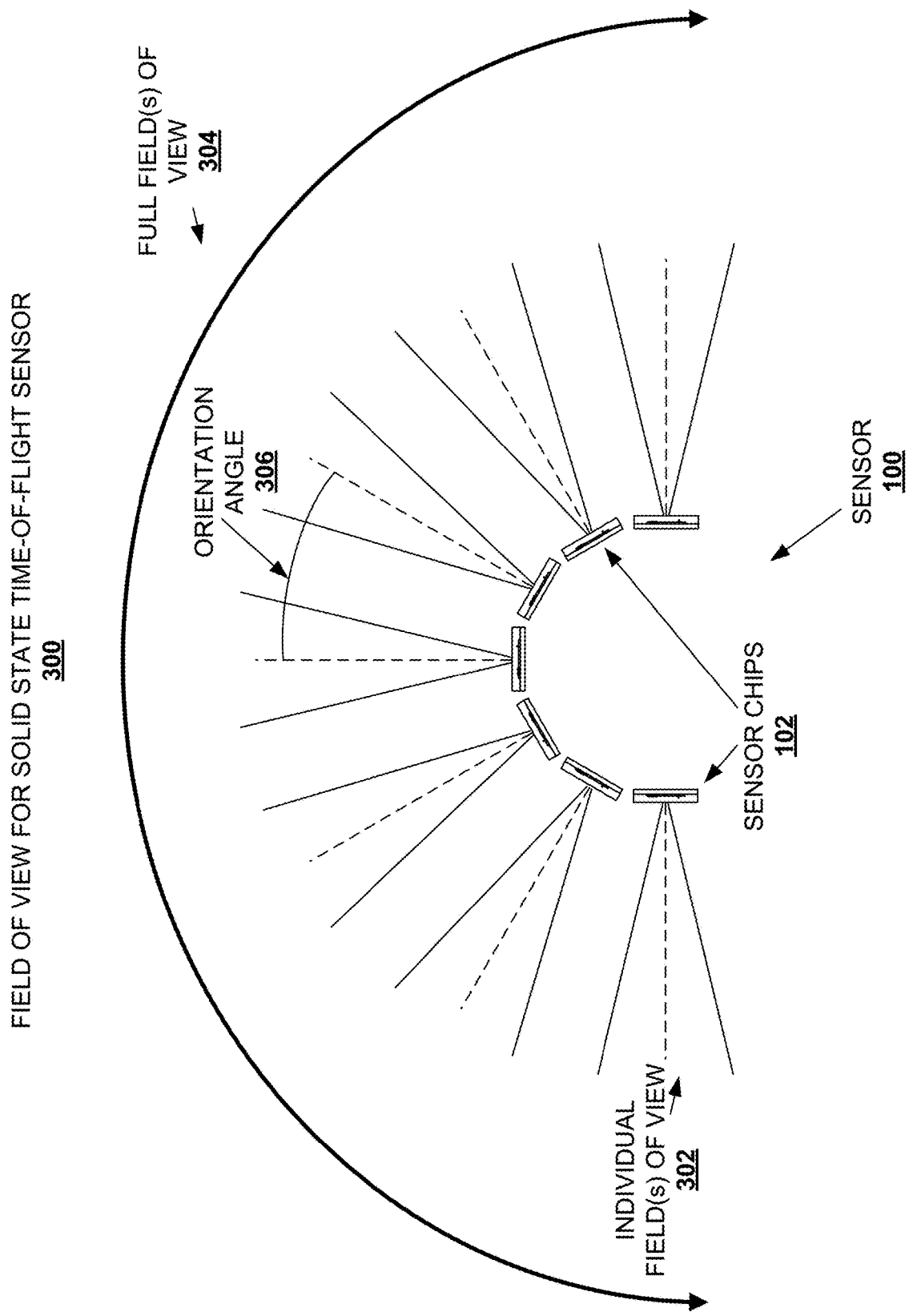
FIG. 3 depicts a diagram of example fields of view of an array of sensors for disclosed machine vision devices in still further embodiments.

FIG. 3 illustrates a diagram of field of view 300 for array of solid state ToF sensors 100 (sensor array 100) according to further embodiments of the disclosure. Sensor array 100 comprises a set of sensor chips 102 arranged in an arc 104 as described at FIG. 1, supra. The sensor chips 102 are respectively arranged at an orientation angle 306 along arc 104. The orientation angle 306 can be selected according to design choice in various embodiments. As one example, sensor chips 102 can be arranged at equal or approximately equal proportions of arc 104. For instance, sensor chips 102 can be arranged at an orientation angle 306 of approximately 30-degree intervals, as one example, although other suitable orientation angles 306 can be utilized. In other embodiments, sensor chips 102 can be arranged at a smaller orientation angle 360 in a particular direction (e.g., a direction of motion of a power equipment machine, see FIG. 9, infra) and at a larger orientation angle 360 in other directions. Thus, orientation angle 360 can be non-uniform for subsets of sensor chips 102, in various embodiments.

Each sensor chip 102 has an individual field of view 302. In combination the individual fields of view 302 aggregate to a full field of view 304 for sensor array 100. In some embodiments, there can be relatively small gaps or blind spots between the individual fields of view 302. This can occur where individual field(s) of view 302 is smaller than orientation angle 306. However, where maximum range of sensor chips 102 is sufficient, movement of the object or movement of sensor array 100 (e.g., when mounted on a moving power equipment machine; see FIGS. 7 and 8, infra) is likely to cause the object to be detected in one of the individual fields of view 302 despite small blind spots.

In at least one embodiment, full field of view 304 can be a full revolution, where arc 104 is about 360 degrees for example. In such embodiment, sensor array 100 can include 12 sensor chips 102 spaced at an orientation angle 306 of about 30 degrees apart. In other embodiments, the arc 104 can be smaller than 360 degrees, or sensor array 100 can include fewer than 12 sensor chips 102, or the orientation angle 306 can be non-uniform, in which sensor chips 102 are spaced at a closer angle in a portion(s) of arc 104 (e.g., in a direction of movement of a power equipment machine) and at a wider angle in another portion(s) of arc 104 (e.g., outside the direction of movement of the power equipment machine).

Figure 4A:
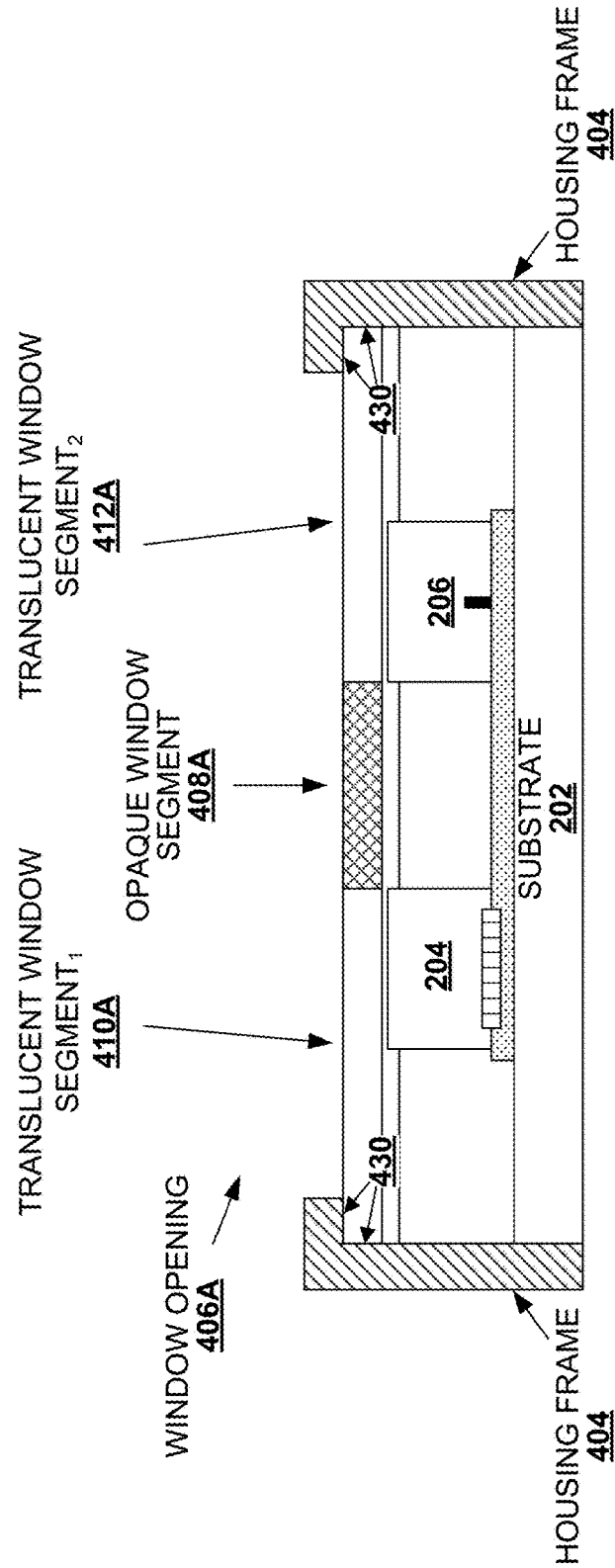
FIG. 4A depicts a block diagram of a sample window structure for disclosed sensor devices according to still further embodiments.

Turning now to FIG. 4, there is depicted a diagram 400 of solid state ToF sensor 200 within a housing according to further embodiments of the present disclosure. ToF sensor 200 can be substantially as described with respect to FIG. 2, supra. Additionally, a housing to physically support ToF sensor 200 and secure a physical position of ToF sensor 200 is provided. The illustration of FIG. 2 is a side-view of the housing including a housing frame 404 and opaque window rib 406. A perspective view of the housing, window openings 412, 414 of the housing and opaque window rib 406 can be seen in FIG. 5, described infra. Other embodiments can have different numbers of windows, different types of windows and correspondingly different shapes of the housing than depicted in FIG. 5. For instance, FIGS. 4A, 4B and 4C depict alternative translucent and opaque window portions to that depicted in FIG. 4, and the present disclosure is intended to include corresponding housing geometries to accommodate these alternative embodiments.

Housing frame 404 can have an inner surface in contact with an outer perimeter of substrate 202 of ToF sensor 200 to secure ToF sensor 200 in place as illustrated. Additionally, a surface of opaque window rib 406 can be flush with or substantially flush with an active surface of ToF sensor 200, as shown in FIG. 4. Window openings 412, 414 are defined by gaps in the housing material between housing frame 404 and opaque window rib 406. Window opening 414 has a first dimension(s) sized to accommodate emission field 226 from the emitter portion of Tx block 206 of ToF sensor 200, and window opening 412 has a second dimension(s) (which can be the same size as the first dimension, in an embodiment) sized to accommodate the sensor FoV 224 of the sensor portion of Rx block 204 of ToF sensor 200, as illustrated.

A pair of translucent windows 410 are provided at window openings 412, 414. Translucent windows 410 can be selected from a window material that has relatively high transmission to a frequency employed by Tx block 206. In some embodiments, Tx block 206 can employ an infrared emission frequency, and the window material can have relatively high transmission to infrared electromagnetic energy (e.g., >30%, >50%, >70%, >85%, or other suitable transmission percentage, or a suitable range of transmission percentages between any of these percentages for infrared spectra, such as 30% to 50%, 70% to 85%, 50% to 85%, and so forth). In other embodiments, Tx block 206 can employ a frequency(ies) between about 900 nanometers (nm) and about 1000 nm, and the window material can have relatively high transmission to electromagnetic energy of the frequency(ies) between about 900 nm and about 1000 nm. In further embodiments, Tx block 206 can employ a frequency(ies) between about 930 nm and about 950 nm, and the window material can have relatively high transmission to electromagnetic energy of the frequency(ies) between about 930 nm and about 950 nm. In at least one embodiment, Tx block 206 can employ a frequency (or small range of frequencies, e.g., +/−1-3 nm) of about 940 nm, and the window material can have relatively high transmission to the electromagnetic frequency (or small range of frequencies) of about 940 nm. In at least one embodiment(s), the window material can have low transmission to frequencies not employed by Tx block 206. For instance, the window material can have low transmission to visible frequencies (e.g., between about 400 nm and about 700 nm), as one example, in combination with relatively high transmission to infrared frequency(ies) employed by Tx block 206. Accordingly, it should be understood that translucent windows 410 are translucent with respect to frequencies employed by Tx block 206, but not necessarily translucent to visible frequencies to the human eye (in at least some embodiments). In other embodiments, window material can be translucent to visible frequencies.

In addition to the foregoing, opaque window rib 406 can be selected to have low transmission to a frequency spectrum employed by Tx block 206 and detected by Rx block 204. Accordingly, most (e.g., greater than 90%, greater than 95%, greater than 99%, etc.) energy emitted by Tx block 206 that is incident upon opaque window rib 406 can be absorbed by opaque window rib 406. This can mitigate or avoid crosstalk between Tx block 206 and Rx block 204, reducing or avoiding effects of crosstalk on time-of-flight object distance determinations of objects outside of ToF sensor 200 and within sensor FoV 224. Opaque window rib 406 can therefore improve reliability of ranging data values calculated by ToF sensor 200. In further embodiments, housing frame 404 can be selected from a material having low transmission to the frequency spectrum employed by Tx block 206 and detected by Rx block 204, helping to mitigate or avoid stray light (e.g., sunlight, artificial light, lamp light etc.) affecting time-of-flight object distance determinations of Rx block 204. In an embodiment, opaque window rib 406 can employ the same material as housing frame 404.

In one or more additional embodiments, paired translucent windows 410 can be secured to housing frame 404 by way of a securing means 430. Securing means 430 can be a mechanical fastening means, such as a groove, etch or channel in which paired translucent windows 410 can rest, that provides friction to resist movement of paired translucent windows 410 out from or away from window openings 412, 414. Securing means 430 can also be an adhesive, in some embodiments. As one example, the adhesive can be a water-resistant, water-tight or water-proof adhesive (e.g., epoxy, glue, resin, and so forth), facilitating a water-resistant seal between housing frame 404 and paired translucent windows 410. This can help to protect the active surface of ToF sensor 200 from moisture and water due to high humidity, or splashing water, or rain in outdoor environments, or the like. In still further embodiments, securing means 430 can include additional mechanisms known in the art for securing a window to a housing, or suitable combinations of the foregoing.

FIG. 4A illustrates a solid state ToF sensor device with continuous window and opaque portion 400A according to alternative embodiments of the present disclosure. The solid state ToF sensor is positioned on a substrate 202 with Tx block 206 and Rx block 204 as described herein. A housing frame 404 is provided with a single window opening 406A. A window having a first translucent window portion$_1$ 410A and a second translucent window portion 412A overlying Rx block 204 and Tx block 206, respectively. An opaque window segment 408A between the translucent window portions is provided to block transmission of transmitted energy from Tx block 206 through the window directly to Rx block 204. Note that translucence and opacity of the window is with respect to electromagnetic emission spectra of Tx block 206 (e.g., infrared energy, etc.).

FIG. 4B depicts an extruded window+opaque portion 400B, according to some disclosed embodiments. Extruded window+opaque portion 400B comprises separate portions as inputs to an extrusion device 402B. The separate portions include a translucent segment$_1$ 410A, opaque segment 408A and translucent segment$_2$ 412A. As described herein, translucence and opacity is with respect to an emission frequency (e.g., infrared frequency) of a solid state ToF sensor as described herein. Output from the extrusion device 404B includes a solid window comprising the portions 410A, 408A and 412A. The solid window can be incorporated into housing frame 404 of solid state ToF sensor with continuous window and opaque portion 400A.

FIG. 4C illustrates a treated window 400C according to further embodiments of the present disclosure. A translucent material 410C is provided. Translucent material 410C is selected from a material that is translucent to an emission frequency of a solid state ToF sensor as described herein. A mask 412C can be provided over a surface of translucent material 410C, leaving a portion of the surface exposed to a treatment 414C. Treatment 414C can be a suitable ultraviolet radiation treatment, in an embodiment, a suitable ion bombardment, in other embodiments, or the like, to form an opaque portion 406C that is opaque to the emission frequency of the solid state ToF sensor. The opaque portion 406C is positioned between translucent portions 410C of a finished window as illustrated. The finished window can be incorporated into housing frame 404 of solid state ToF sensor with continuous window and opaque portion 400A.

Figure 5:
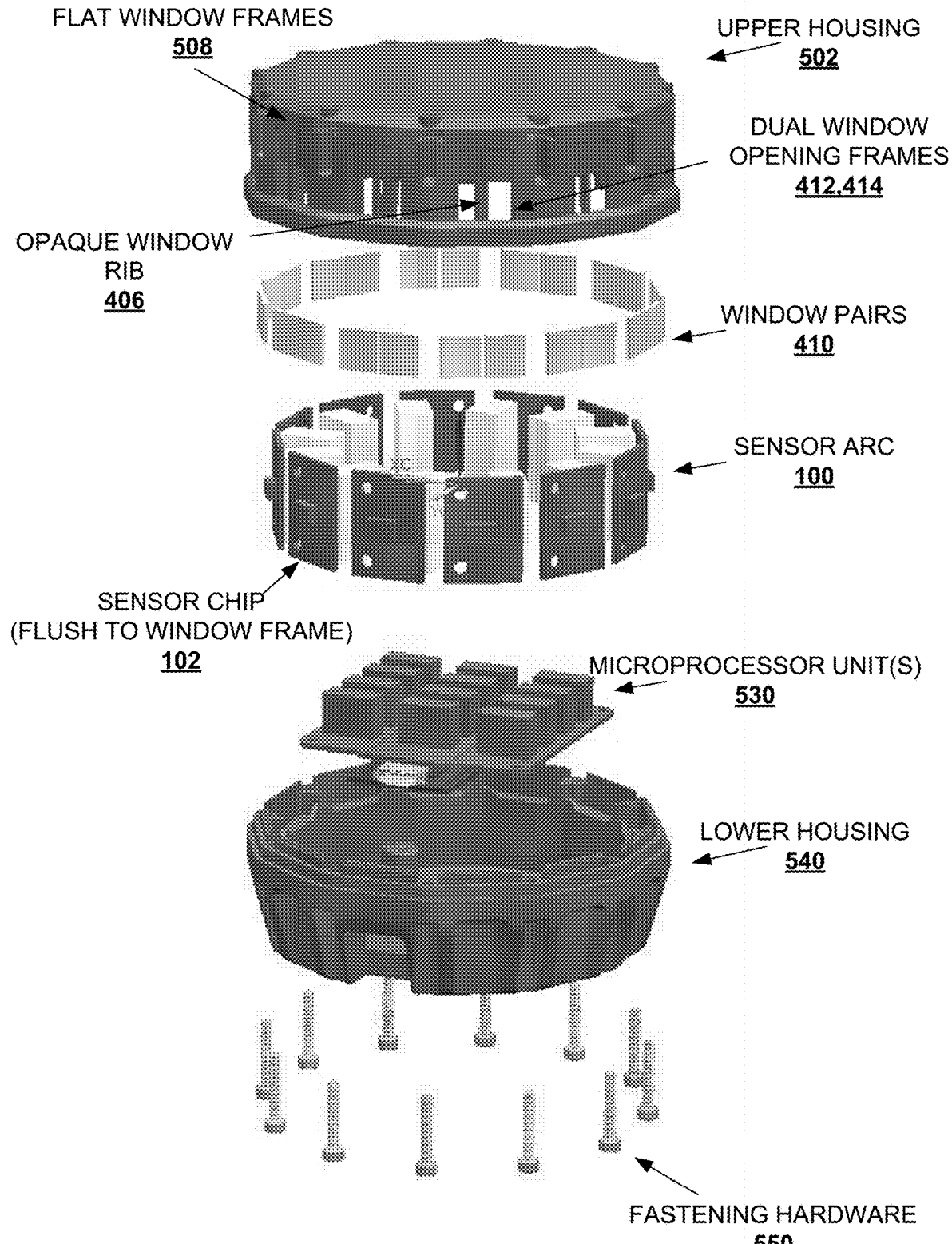
FIG. 5 depicts a diagram of an example solid state time-of-flight (ToF) sensor machine vision device for a power equipment machine, in still further embodiments.

FIG. 5 illustrates a diagram of an example solid state ToF sensor module 500 according to alternative or additional embodiments of the present disclosure. Solid state ToF sensor module 500 can be utilized to generate and analyze ranging data in a volume about solid state ToF sensor module 500. In response to the ranging data, ToF sensor module 500 can output data indicative of a distance from ToF sensor module 500 for each of multiple portions of the volume, and index data identifying the respective portions of the volume, in an embodiment. Each portion of the volume can map to a field of view of a sensor chip as disclosed herein (e.g., see FIG. 3, supra). The distance data and index data can be output to a control system of a power equipment machine for analysis of distance of objects (and approximate position within the volume) to the power equipment machine in conjunction with object avoidance programming of the control system, in such embodiments. In other embodiments, ToF sensor module 500 can analyze the distance data and index data and generate an alert (e.g., an output signal) for the control system of the power equipment machine based on analysis of the ranging data. In response to the alert the control system of the power equipment machine can take a corrective action as directed by object avoidance programming of the control system. Examples of corrective actions can include: stopping movement of the power equipment machine, slowing movement of the power equipment machine, changing direction of the power equipment machine, cutting power to a work engine (e.g., drive belt of a mowing device, etc.) of the power equipment machine, or the like, or a suitable combination of the foregoing. In the latter embodiments, the alert or output signal can be provided to the control system in the event that ToF sensor module 500 detects an object within a threshold distance (or one of multiple threshold distances) of ToF sensor module 500.

An alert signal can have different characteristics based on different design choices. In a basic sense, the alert signal can be a high/low output that changes (e.g., from low to high; from high to low) in response to detecting an object within a threshold distance from ToF sensor module 500. In other embodiments, the alert signal can include periodic data to indicate that ToF sensor module 500 is active and alert data is current (and, e.g., that the alert signal is not merely stuck in a low or high position). The periodic data can include periodic time data, counter data, or any other suitable data distinguishing a most recent activity of ToF sensor module 500 from previous activity of ToF sensor module 500. In further embodiments, multiple alert signals may be provided. For instance, a first alert signal can be generated in response to detecting an object within a first threshold distance, and a second alert signal can be generated in response to detecting the object within a second (or additional) threshold distance. The first threshold distance can correspond with different distance values from the ToF sensor module 500, can correspond with different portions of the volume about ToF sensor module 500 (e.g., a portion within a direction of movement, a portion outside a direction of movement), or other examples, or suitable combinations thereof.

Figure 9:
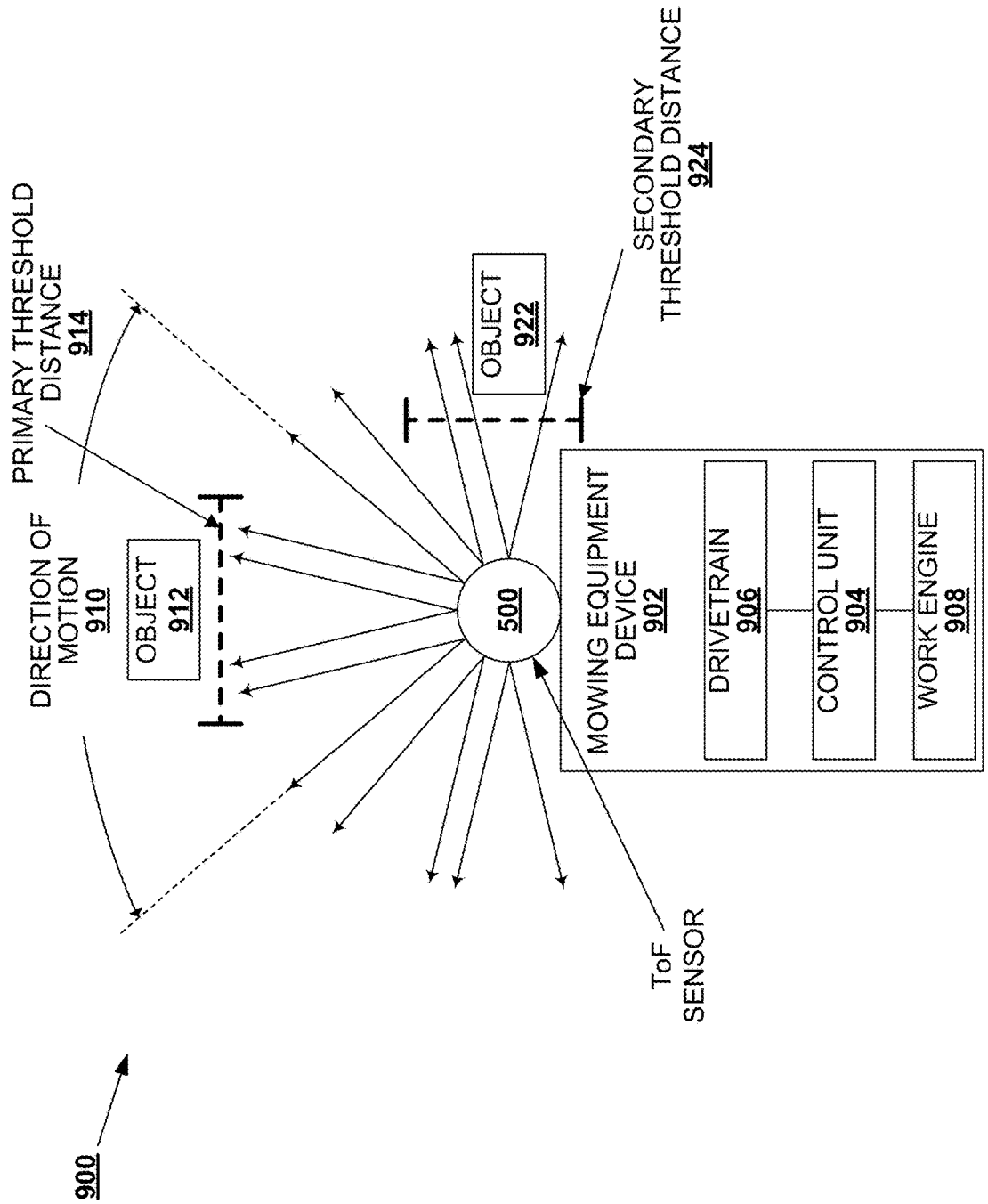
FIG. 9 illustrates a diagram of example primary and secondary ranging thresholds for machine vision devices in one or more embodiments.

In some embodiments, ToF sensor module 500 can be configured to identify a direction of movement of the power equipment device (and of ToF sensor module 500 mounted thereto) and initialize a subset of sensor chips 102 having fields of view within the direction of movement (e.g., see FIG. 9, infra). A primary threshold distance can be assigned to the subset of sensor chips 102 within the direction of movement. A second subset of sensor chips 102 outside the direction of movement can be assigned a secondary threshold distance, smaller than the primary threshold distance. This primary threshold distance can be larger than the secondary threshold distance because of the increased likelihood of impact with an object that the power equipment device is moving toward, and the need to implement corrective actions more quickly (e.g., stopping, reducing speed, changing direction, stopping/reducing power to the work engine, and so forth). Thus, the output signal can be generated by ToF sensor module 500 in response to objects of different distance, in at least some embodiments of the present disclosure, depending on whether the object(s) is within the direction of movement of ToF sensor module 500 (as defined by fields of view of the subset of ToF sensor chips 102 as compared with fields of view of the second subset of sensor chips 102). In an embodiment(s), the primary threshold distance can be 4 meters (m) or less, 3.5 m or less, 3 m or less, 2.5 m or less, 2 m or less, or other suitable value between these numbers, or any suitable range between pairs of these values. The secondary threshold distance can be 2.5 m or less, 2 m or less, 1.5 m or less, suitable ranges therein, and so forth.

ToF sensor module 500 can comprise an upper housing 502 and lower housing 540. The upper housing 502 and lower housing 540 can be cylindrical or approximately cylindrical in shape, in one embodiment. Flat (or approximately flat) window frames 508 are provided at a perimeter of upper housing 502, generally one window frame 508 for each sensor chip 102 of an array of sensors arranged along an arc (sensor array 100). In the illustrated embodiment, each window frame 508 comprises a dual window frame opening 412, 414 and opaque window rib 406, substantially as described in FIG. 4, supra. Window pairs 410 are seated in the dual window opening frames 412, 414 of each flat window frame 508, flush with an interior surface of housing frame 404 (see FIG. 4). In other embodiments, different numbers of window openings can be provided in upper housing 502, such as a single window opening, three or four window openings, and so forth. In some embodiments, the opaque window rib 406 can be integrated as part of the window(s) and not incorporated as part of housing 502 (e.g., see FIGS. 4A, 4B and 4C, supra). Likewise, sensor array 100 comprises a set of sensor chips 102, each positioned within interior surfaces of respective window frames of flat window frames 508, flush to the opaque window ribs 406 thereof. Sensor chips 102 can output ranging data that can be utilized to determine a distance of an object within the field of view of a given sensor chip 102, to a microprocessor(s) 530.

Electronics 114 of sensor array 100 can be connected to a microprocessor unit(s) 530. Connection can be by way of respective wires and wire harnesses that electrically couple a sensor chip 102 (or plurality of sensor chips 102) with a microprocessor unit 530 (or one of multiple microprocessor units 530). This embodiment can facilitate simple reorganization of sensor chips 102 along a variety of arcs 104, surfaces (e.g., see FIG. 6, infra), or the like. In other embodiments, electronics 114 can connect sensor array 100 to microprocessor unit(s) 530 by way of printed circuit board connections there between.

Electronics 114 provide electric power to sensor chips 102, and provide a data and control interface(s) with microprocessor unit(s) 530. Microprocessor unit(s) 530 can comprise separate microprocessors for each of sensor chips 102, in an embodiment. In other embodiments, a microprocessor can be connected with respective groups of sensor chips 102. In yet another embodiment, a single microprocessor can be connected to all the sensor chips 102, depending on implementation. For implementations with multiple microprocessor units 530, respective microprocessor units can separately receive and analyze ranging data from associated sensor chip(s) 102, generating a distance value from the ranging data (e.g., in millimeters, in centimeters, in inches, in feet, or any other suitable distance measurement standard). For implementations with a single microprocessor unit 530, the microprocessor unit can aggregate the ranging data and index data to calculate distances (from the ranging data) in respective fields of view (from the index data) to identify distance of an object(s) and orientation about ToF sensor module 500 of such object(s). In some embodiments, the calculated distances can be output from ToF sensor module 500 for utilization by a control module of a power equipment machine. In other embodiments, a microprocessor unit(s) can generate an output signal (e.g., an alert signal(s)) in response to determining an object has a distance to ToF sensor module 500 equal to or less than a threshold distance (e.g., a general threshold distance, a primary threshold distance, a secondary threshold distance, or other suitable threshold distance).

Microprocessor unit(s) 530 can be programmed with the threshold distance(s) described above. Further, microprocessor unit(s) 530 can be configured to identify a direction of movement of ToF sensor module 500 and identify a subset of sensor chips 102 of sensor array 100 within the direction of movement. The number of sensor chips 102 in the subset of sensor chips 102 can be changeably programmed to microprocessor unit(s) 530, in an embodiment, allowing customization of a field of view associated with the direction of movement (and the primary threshold distance; see FIG. 9, infra, for example). The microprocessor unit(s) 530 can generate the output signal in response to an object distance within the primary threshold distance (e.g., if the microprocessor unit 530 is initialized to be within the direction of movement) or can generate the output signal in response to an object distance within the secondary threshold distance (e.g., if the microprocessor unit 530 is initialized to be outside the direction of movement), depending on implementation. Alternatively (or in addition to the primary and second threshold distances), a general threshold distance can be employed. For the general threshold distance, an object detected by any of sensor chips 102 to be equal to or less than the general threshold distance can cause microprocessor unit(s) 530 to generate the output signal. This general threshold distance can be regardless of direction of movement or orientation of the power equipment machine. In an embodiment, the general threshold distance can be implemented by microprocessor unit(s) 530 in conjunction with the primary threshold distance or the secondary threshold distance, or can be implemented as an alternative to the primary and secondary threshold distances.

In some embodiments, microprocessor unit(s) 530 can be selected to have a clock frequency suitable to receive and process ranging data from an associated sensor chip(s) 102 at a ranging frequency of the associated sensor chip(s) 102. Processing of ranging data can include comparing respective distance measurements of the ranging data to a threshold distance(s), and determining whether a distance measurement is equal to or less than the threshold distance(s). The processing also includes, in response to determining the distance measurement is equal to or less than the threshold distance(s), generating the output signal and providing the output signal to a control unit of a power equipment machine.

As an illustrative example, a clock frequency for microprocessor unit(s) 530 can be selected to be suitable to receive a distance data value, do, of the ranging data from at least one sensor chip 102, optionally identify a proper threshold distance (e.g., general threshold distance, primary threshold distance, secondary threshold distance, and so forth) for the do distance data value, convert the distance data value to a distance measurement, compare a value of the distance measurement to the (identified) threshold distance, determine whether the value of the distance measurement is equal to or less than the threshold distance, generate the output signal, and provide the output signal to the control unit of the power equipment machine, before receiving a subsequent value $d_1$ of the ranging data from the same sensor chip 102. In alternative embodiments, the clock frequency can be selected to be suitable to receive distance data values for each of x sensor chips 102, convert the distance data values to distance measurements, determine orientations of the distance data with respect to ToF sensor module 500, compare each of the distance measurements to one or more distance thresholds (e.g., depending on orientation(s)), and generate an output signal(s) in response to a distance measurement satisfying a predetermined criteria in relation to a distance threshold(s). The ranging frequency of the sensor chip can be an additional constraint on the selection of the clock frequency for microprocessor unit(s) 530. In an embodiment, the clock frequency can be selected from a range of about 1 megahertz (Mhz) to about 200 Mhz. In further embodiments, the clock frequency can be selected from a range of about 1 Mhz to about 120 Mhz. In yet another embodiment, the clock frequency can be selected from about 5 megahertz (Mhz) to about 100 Mhz. In still other embodiments, the clock frequency can be selected from a range of about 5 Mhz and about 50 Mhz. In at least one embodiment, for example where the ranging frequency is 50 Hz or about 50 Hz, the clock frequency for microprocessor unit(s) 530 can be selected to be about 10 Mhz.

Selecting a microprocessor clock frequency as described herein can facilitate very low costs for microprocessor unit(s) 530, as compared to much more expensive gigahertz clock frequencies of modern microprocessor devices utilized for competing machine vision technologies. While such machine vision technologies can define sharp edges of objects, defining and particularly tracking sharp edges requires high resolution image capture and much higher capacity data processing (due to the higher data requirements of high-resolution imaging). Moreover, tracking sharp edges requires frequent updates to the high-resolution image capture and high capacity data processing, multiplying the hardware requirements. The processor, memory and high-speed bus requirements for this type of implementation can cost orders of magnitude higher than ToF sensor module 500. Meanwhile, ToF sensor module 500 can provide object proximity information at a ranging frequency and output signal frequency more than sufficient for a control unit of a power equipment machine to take corrective action in response to object detection, and avoid hitting or harming (e.g., by a cutting blade of a work engine) the object. ToF sensor module 500 addresses a significant market demand for low cost yet reliable safety and object avoidance capability for power equipment machines, in various embodiments.

In one or more additional embodiments, multiple ToF sensor modules 500 can be implemented with a power equipment machine. The multiple ToF sensor modules 500 can have respective microprocessor unit(s) 530 configured to operate in conjunction with each other. In some implementations, conjoined operation of multiple ToF sensor modules 500 can facilitate redundancy in case of hardware or software failure of one system. With the low cost design of many disclosed embodiments, the redundancy can be implemented with minimal impact to price point as compared with competing machine vision systems (see, e.g., FIG. 8, infra).

As illustrated, ToF sensor module 500 also includes a lower housing 540 and fastening hardware 550 to secure lower housing to upper housing 502, and secure microprocessor unit(s) 530, sensor array 100, and window pairs 410 within ToF sensor module 500. Fastening hardware can include any suitable hardware for securing lower housing 540 to upper housing 502, including screws, nails, rivets, bolts, bolt+nut combinations, adhesive(s), clips to secure lower housing 540 to upper housing 502, snap-on shapes fabricated as part of lower housing 540 or upper housing 502 to model the function of clips, matching threaded grooves within an upper lip of lower housing 540 and lower lip of upper housing 502 to thread lower housing 540 into upper housing 502 (or vice versa), or any other suitable mechanism known in the art, subsequently developed or reasonably conveyed to one of skill in the art by way of the context provided herein.

Although not explicitly depicted, ToF sensor module 500 can include a communication interface(s) (not depicted) configured to couple with a control unit of a power equipment machine. The communication interface can be a wired interface, in some embodiments, or can be a wireless interface, in other embodiments, or both in still further embodiments (see FIG. 11, infra for examples of wired and wireless interfaces, which also can be implemented for the communication interface(s) of ToF sensor module 500). The communication interface can be configured to convey the output signal generated by microprocessor unit(s) 530 to the control unit of the power equipment machine. The control unit can be configured to implement a corrective action (e.g., slow speed, stop, change direction, reduce or eliminate power to a work engine, etc.) in response to the output signal. In some embodiments, the communication interface can also include a data interface for exchanging data between ToF sensor module 500 and the control unit, or can include a signal interface for exchanging instructions, commands or the like between ToF sensor module 500 and the control unit. In an embodiment, the control unit can be a computing device (e.g., see FIG. 11, infra), such as a special-purpose computing device (e.g., designed specifically for use with a power equipment device), or a general-purpose computing device (e.g., programmed to interface with and operate the power equipment device), or other suitable computing device.

Figure 6:
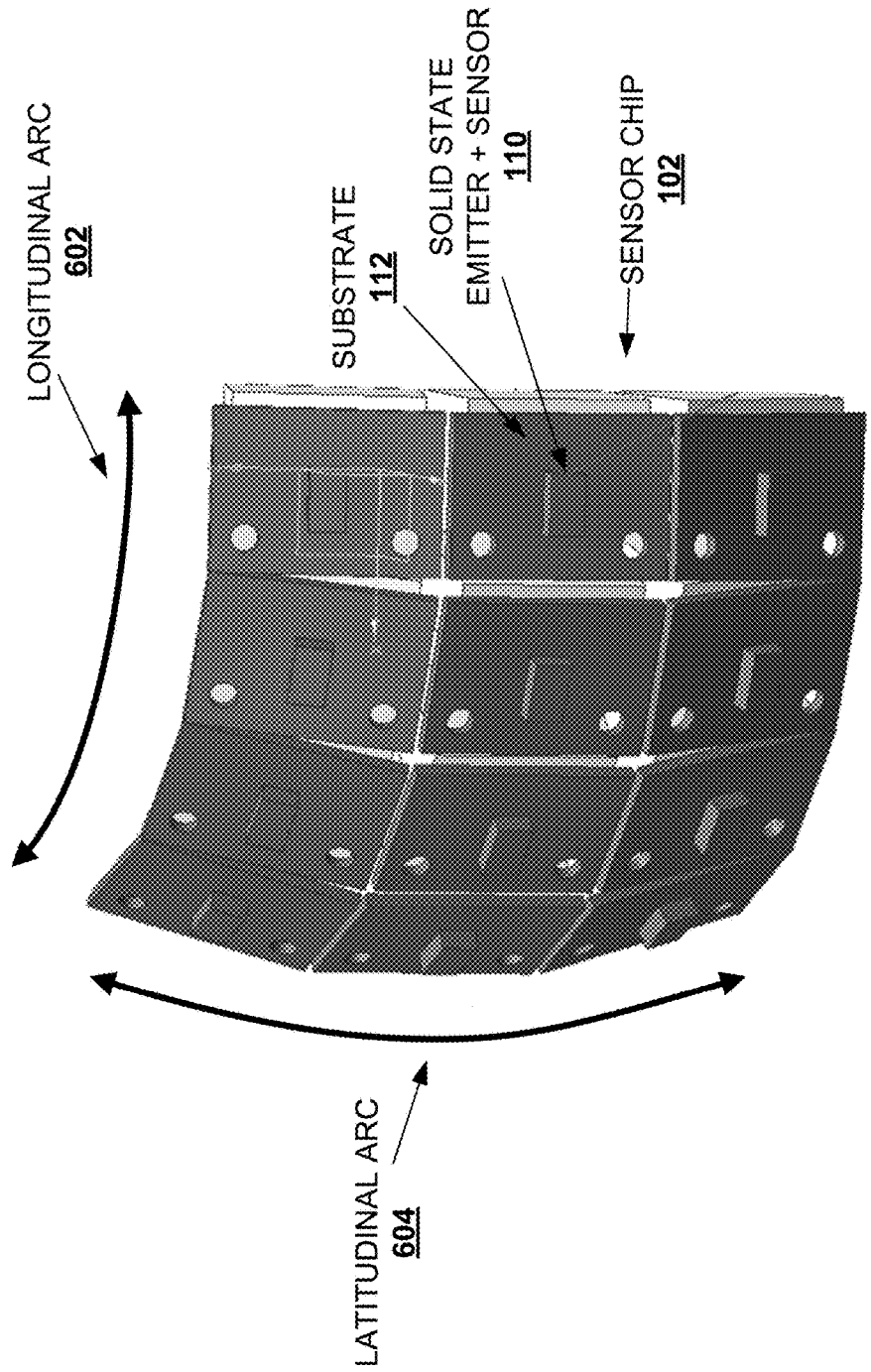
FIG. 6 illustrates a diagram of an arrangement of solid-state sensors for a machine vision device according to alternative embodiments of the present disclosure.

FIG. 6 illustrates a diagram of a solid-state proximity sensor module 600 according to still further embodiments of the present disclosure. Solid state proximity sensor module 600 includes a plurality of sensor chips 102 arranged along a surface of a three-dimensional object. The three-dimensional object can be a sphere (or approximation of a sphere), a ball (which can be a sphere or approximation of a sphere or any suitable solid revolved about one or more axis), an ovoid (or approximation of an ovoid), or the like or any suitable variation or combination of the foregoing.

In the illustration of FIG. 6, an example surface of a three-dimensional object defined by two arcs is illustrated. A longitudinal arc 602, and a latitudinal arc 604. Sensor chips 102 can be substantially as described herein, including a substrate 112 with a solid-state emitter and sensor 110 mounted on the substrate, and electronics (not depicted) to power the solid-state emitter and sensor 110, provide a data bus to or from the solid-state emitter and sensor 110 as well as a command address for programming the solid-state emitter and sensor 110.

Solid state proximity sensor module 600 can provide an alternative to sensor array 100, by increasing field of view along a dimension of the latitudinal arc 604 relative to sensor array 100. Where sensor array 100 has a vertical field of view (e.g., +/− z axis) defined by the field of view of the solid-state emitter and sensor 110 in some embodiments, proximity sensor module 600 has multiple sensor chips 102 along the latitudinal arc 604, increasing the vertical field of view (e.g., +/− z axis). Moreover, proximity sensor module 600 is not limited by the number of sensor chips 102 depicted by FIG. 6. In some embodiments, sensor chips 102 can be placed along a full revolution of latitudinal arc 604, or along longitudinal arc 602, or a combination thereof. In other embodiments, a portion of a full revolution of latitudinal arc 604 or a portion of a full revolution of longitudinal arc 602 can be embodied by sensor chips 102, different than that depicted. For instance, though 3 sensor chips 102 are shown arranged along latitudinal arc 604, there may be more or fewer sensor chips 102, up to a full revolution of latitudinal arc 604. Likewise, though 3 sensor chips 102 are shown arranged along longitudinal arc 602, there may be more or fewer sensor chips 102, up to a full revolution of longitudinal arc 602.

Figure 6A:
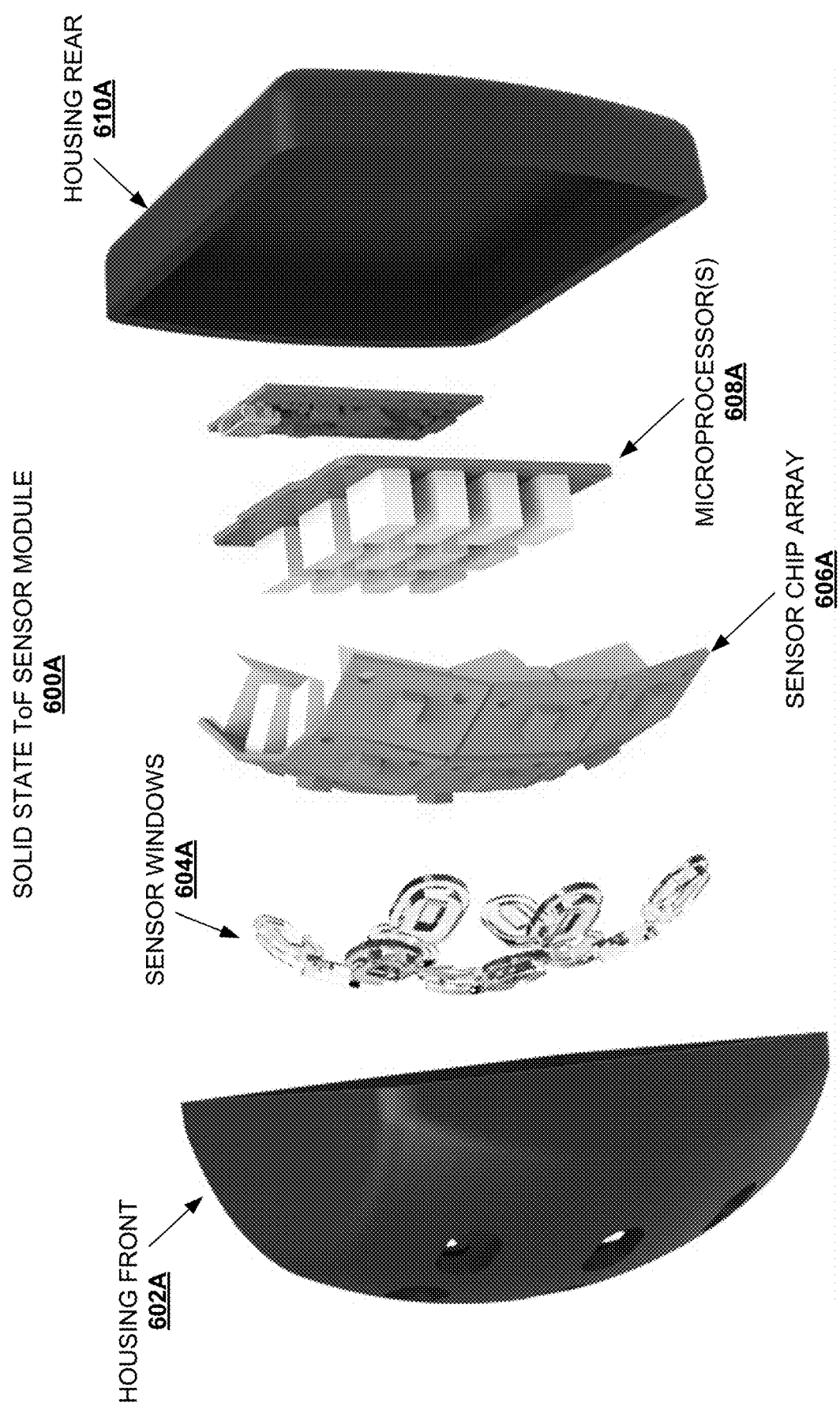
FIG. 6A depicts a diagram of a solid state ToF sensor module, in a distributed arrangement, for the sensor array arranged along a 2-D surface, in another embodiment(s).
Figure 6B:
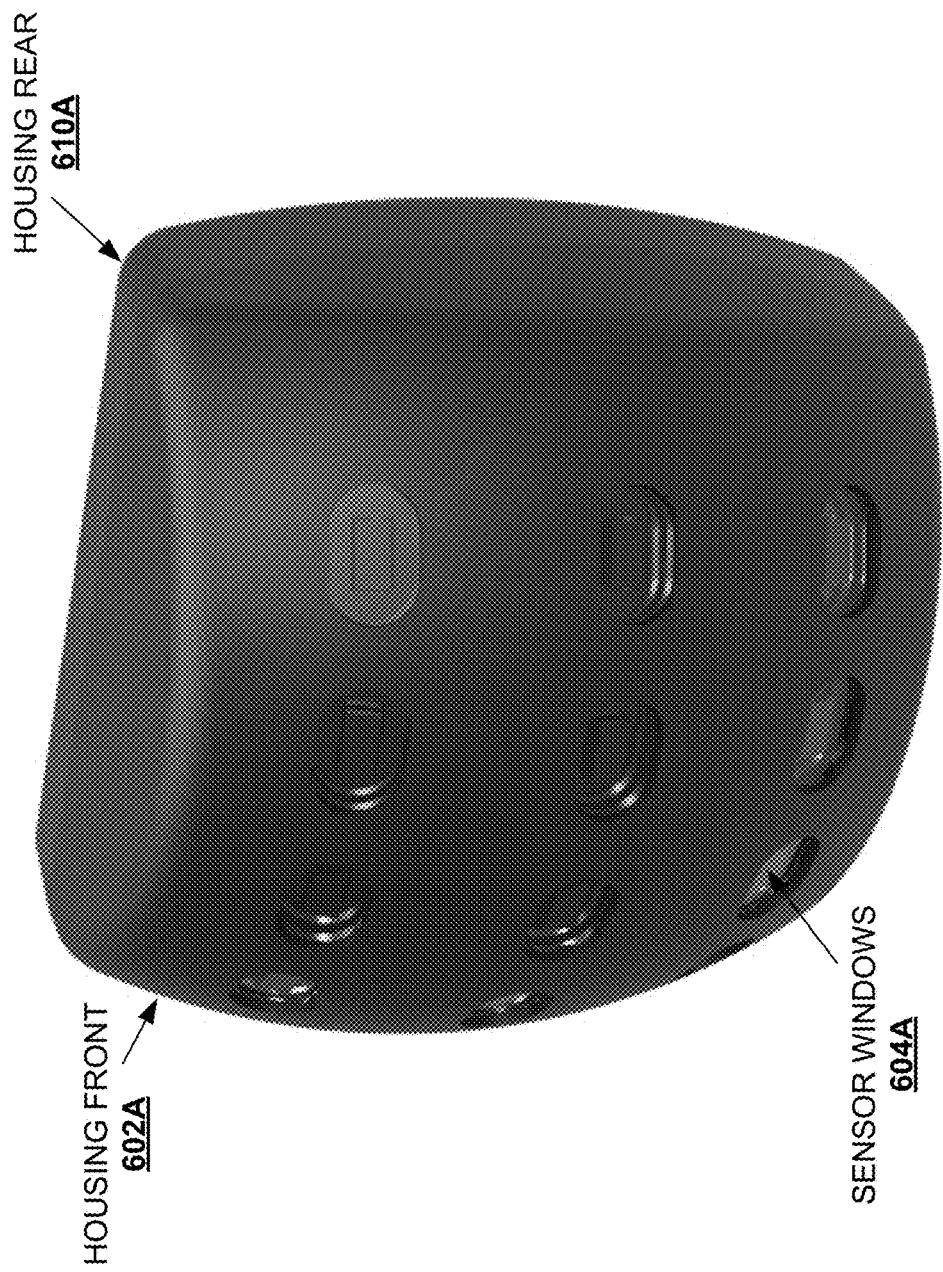
FIG. 6B illustrates a diagram of the solid state ToF sensor module of FIG. 6A in a compact arrangement, in further embodiments.

FIGS. 6A and 6B illustrate diagrams of an example solid state ToF sensor module according to alternative or additional embodiments. Solid state ToF sensor module 600A provides a distributed element illustration, whereas solid state ToF sensor module 600B provides a compact element illustration. Solid state ToF sensor module 600A illustrates a sensor chip array 606A arranged along a two-dimensional surface, similar to solid-state proximity sensor module 600 of FIG. 6, supra. A housing is provided for solid state ToF sensor module 600A, including a housing front 602A and housing rear 610A, to enclose sensor chip array 606A. Also provided are sensor windows 604A formed of a material that is translucent (or mostly translucent) to a spectrum utilized by sensor chip array 606A (e.g., an infrared spectrum; a spectrum (or range of spectra) disclosed herein, or other suitable spectra). Sensor windows 604A can be seated into window openings of housing front 602A, facilitating transmission of electromagnetic radiation and receipt of electromagnetic radiation employed by sensor chip array 606A through the sensor windows 604A and the window openings of housing front 602A. Sensor windows 604A can be seated within the window openings of housing front 602A with a water-tight or air-tight seal, as described herein or known in the art. Microprocessor(s) 608A are provided for sensor chip array 606A, and seated inside of housing rear 610A. Housing front 602A and housing rear 610A secure together to form a compact structure illustrated by solid state ToF sensor module 600B of FIG. 6B.

Figure 7:
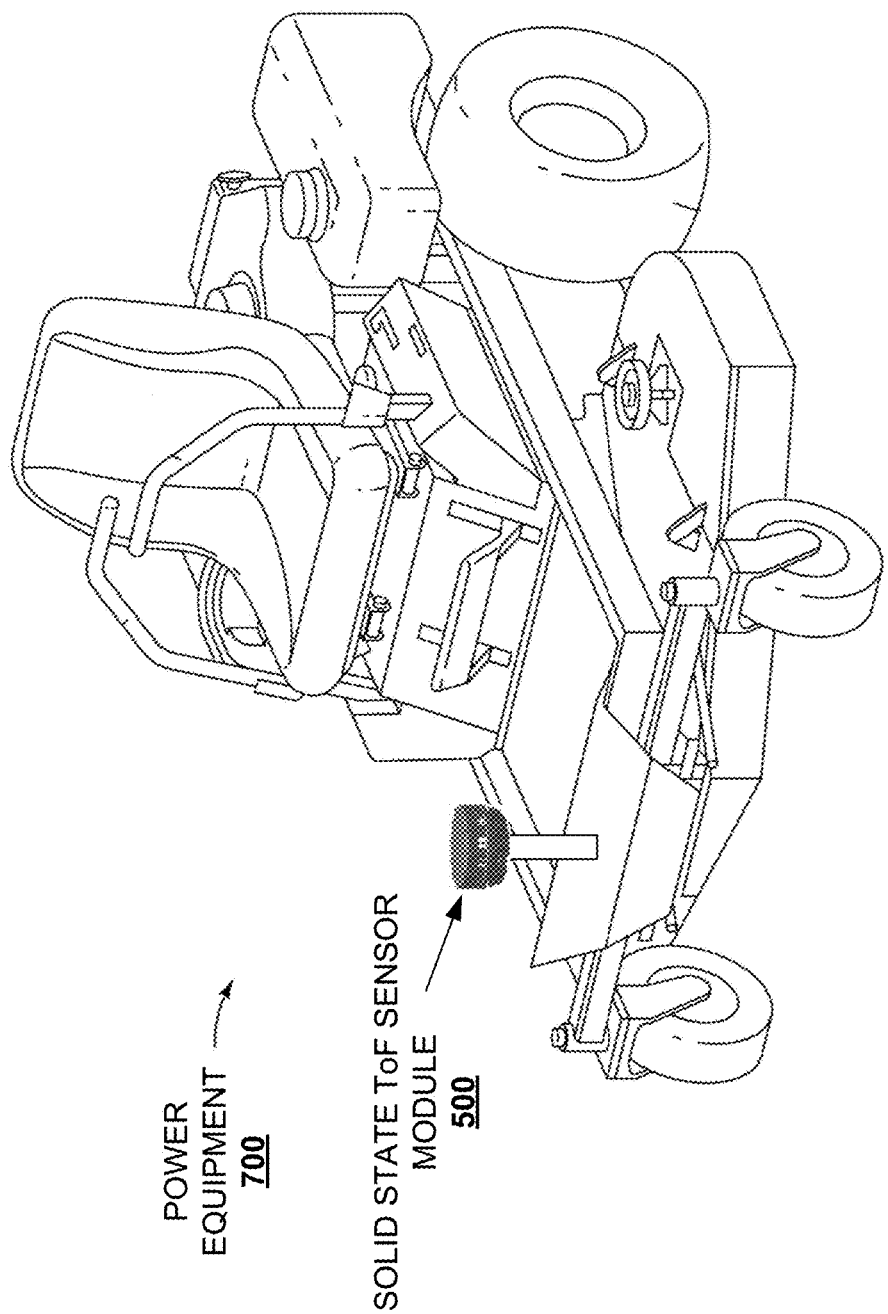
FIG. 7 depicts a diagram of an example implementation of a solid state ToF sensor according to the present disclosure in conjunction with a power equipment machine.

FIG. 7 depicts a diagram of an example power equipment machine 700 equipped with a solid state ToF sensor module 500 (or solid state ToF sensor module 600B, which can be substituted by design choice for solid state ToF sensor module 500 where referenced herein) as described herein. Solid state ToF sensor module 500 can be positioned at different locations on power equipment machine 700 than depicted in FIG. 7, according to design choice. For instance, a solid state ToF sensor module 500 can be located at a rare of power equipment machine 700 (e.g., behind the seat of power equipment machine 700), as an alternative to or in addition to the depicted location of solid state ToF sensor module 500.

A control unit (not depicted) can be provided with power equipment machine 700 that has partial control over a drivetrain of power equipment machine, or over a work engine (e.g., mowing deck mechanical drive mechanism) of power equipment machine, or a combination thereof. This embodiment can be implemented where the control unit and solid state ToF sensor module 500 are part of an automated safety and object avoidance system assisting an operator of power equipment machine 700. In other embodiments, the control unit can have complete control over the drivetrain and work engine of power equipment machine 700, for instance in an embodiment where the control unit and solid state ToF sensor module 500 are part of an autonomous control system for the power equipment device 700 (having no human operator).

The control unit can be responsive to an output signal generated by solid state ToF sensor module 500. Upon receipt of the output signal, the control unit is programmed to implement a corrective action on the drivetrain or work engine. The corrective action is selected from a group consisting essentially of: slowing the drivetrain (and movement) of power equipment machine 700, stopping the drivetrain (and movement) of power equipment machine 700, and stopping the work engine of power equipment machine 700. In at least one embodiment, the control unit can also control steering of power equipment machine 700. In the latter embodiment, the group of corrective actions can also include: changing direction of power equipment machine 700.

Once corrective action is taken, the control unit can await a clearing of the output signal, or a change in the output signal (e.g., from an alert state, to a non-alert state, or the like) by solid state ToF sensor module 500. Once the output signal is cleared/changed, the control unit can release the corrective action and allow (or continue) normal operation of power equipment machine 700.

Figure 7A:
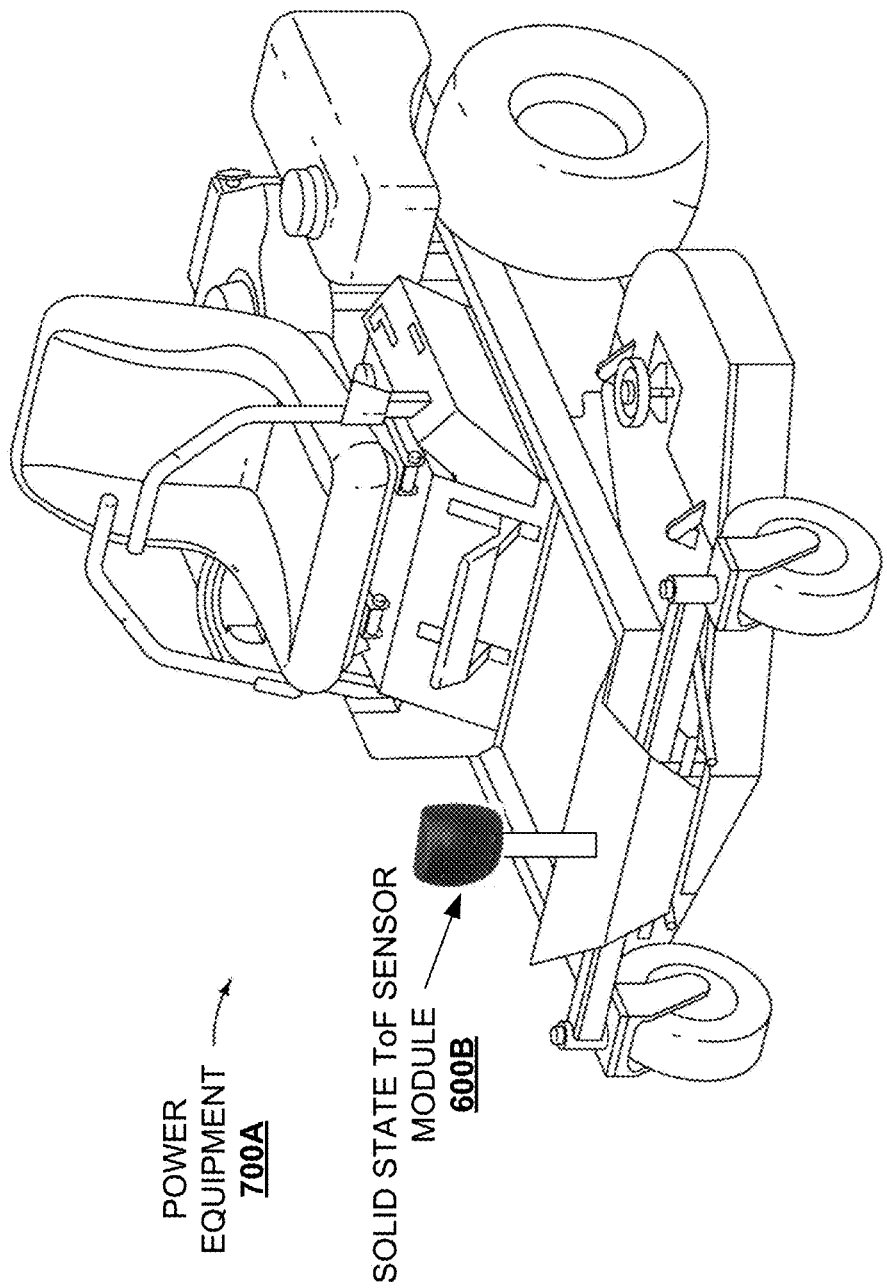
FIG. 7A illustrates a diagram of a sample implementation of a solid state ToF sensor module with a power equipment machine according to alternative embodiments.

FIG. 7A depicts an alternative embodiment of a power equipment device 700A. Power equipment device 700A includes solid state ToF sensor module 600B incorporating the design of solid state proximity sensor module 600 and solid state ToF sensor module 600A. Solid state ToF sensor module 600B can facilitate detection of an object within a (forward) direction of motion of power equipment device 700A. Additionally, solid state ToF sensor module 600B can have a portion of sensors directed toward a ground in front of power equipment device 700A, for object detection directly in front of power equipment device 700A, according to further embodiments. Solid state ToF sensor module 600B can operate similar to solid state ToF sensor module 500 or other sensor modules described herein, in conjunction with generating distance data or signal alerts to a control unit of power equipment device 700A.

Figure 8:
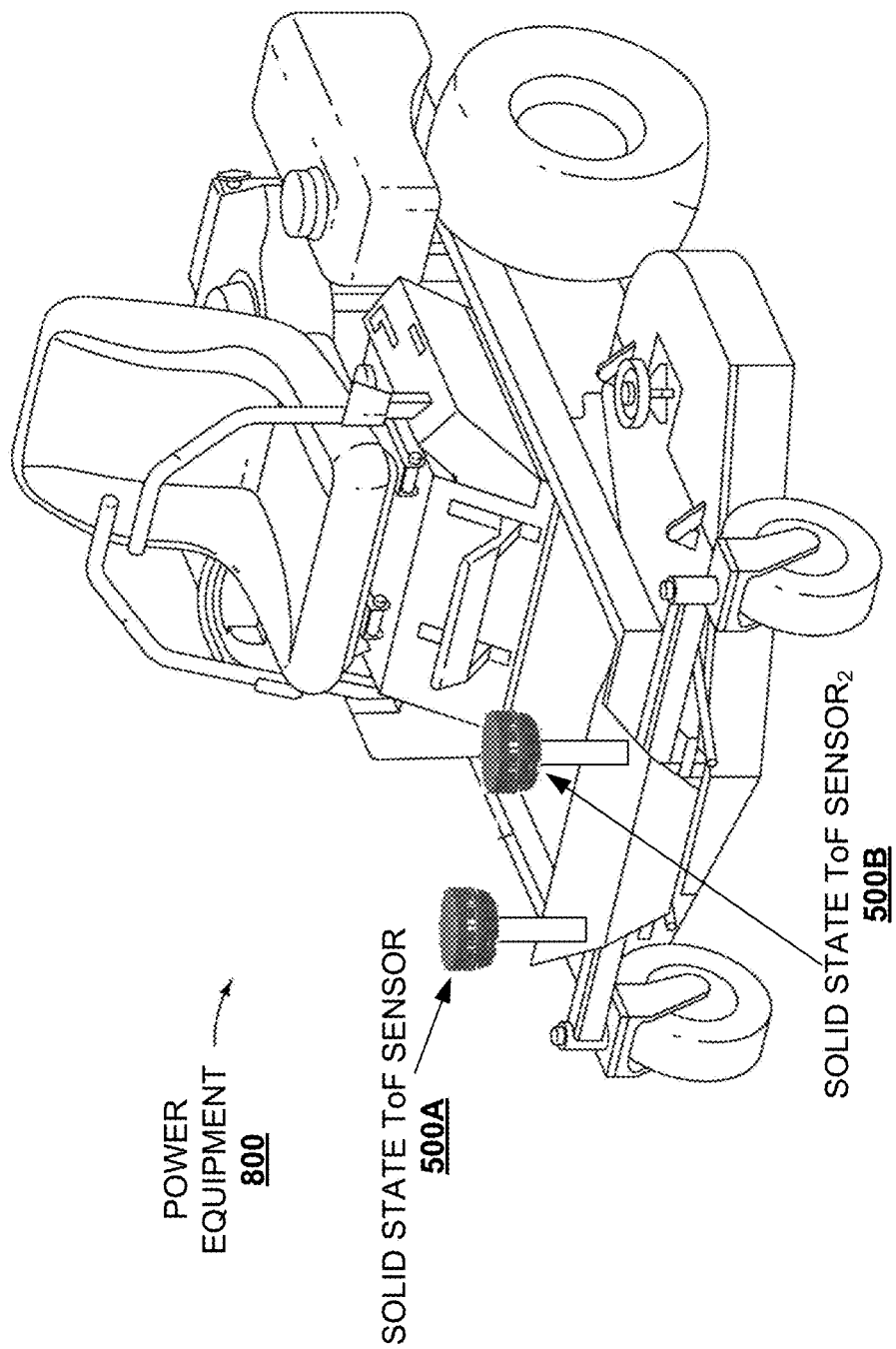
FIG. 8 depicts a diagram of an alternative implementation of multiple solid state ToF sensors in conjunction with a power equipment machine, in further embodiments.

Turning now to FIG. 8, a diagram of a power equipment machine 800 comprising multiple ToF sensor modules 500A, 500B (one or both of which can be swapped with solid state ToF sensor module 600B in at least one embodiment) is illustrated in accordance with still further embodiments of the present disclosure. In some such embodiments, a first ToF sensor module: solid state ToF sensor module$_1$ 500A can be programmed to operate in a coordinated fashion with a second ToF sensor module: solid state ToF sensor module$_2$ 500B (referred to collectively as ToF sensor modules 500A, 500B). In other embodiments, ToF sensor modules 500A, 500B can operate independently, each detecting proximity of objects within respective spatial volumes about power equipment machine 800 and generating an alert(s) without coordination with the opposing ToF sensor modules 500A, 500B.

As one example of coordinated operation, ToF sensor modules 500A, 500B can offset their respective ranging frequencies. The effect of offset ranging frequencies can be implemented as follows: at a beginning of a first period of the ranging frequency ToF sensor module$_1$ 500A can first generate and analyze a set of ranging data for the first period and determine whether or not to generate an output signal. Following a delay in the first period (e.g., half the period, or other suitable delay), ToF sensor module$_2$ 500B can then generate and analyze a second set of ranging data for the first period and determine whether or not to generate an output signal. After the first period expires a second period begins and ToF sensor module$_1$ 500A can generate and analyze a third set of ranging data for the second period, and following a delay in the second period ToF sensor module$_2$ 500B can generate and analyze a fourth set of ranging data also in the second period, and so on. As another example, the respective ToF sensor modules 500A, 500B can be configured to operate at half of a ranging frequency, alternating back and forth to combine to the ranging frequency. In alternative embodiments, ToF sensor modules 500A, 500B can operate simultaneously independent of each other.

Utilizing multiple ToF sensor modules 500A, 500B can provide error mitigation for the machine vision functions provided by ToF sensor modules 500A, 500B for power equipment machine 800. In the event that a sensor chip 102 fails on one ToF sensor module 500A the other ToF sensor module 500B can serve as a backup. Accordingly, ToF sensor modules 500A, 500B can facilitate redundant functionality. Moreover, it should be appreciated that the position of ToF sensor modules 500A, 500B is exemplary only. In other embodiments, solid state ToF sensor modules 500A, 500B can be positioned in other suitable locations of power equipment machine 800, such as front and back of power equipment machine 800, left and right (near the center of power equipment machine 800), diagonal corners (front left and rear right, front right and rear left), or the like. In addition, multiple ToF sensor modules 500A, 500B can be placed both on a single mount, vertically one above another in at least one embodiment.

Turning now to FIG. 9, there is depicted a diagram 900 of a ToF sensor module 500 according to alternative or additional embodiments of the present disclosure. Depicted is a mowing equipment device 902, such as a lawnmower, riding mower, autonomous mowing machine, or the like. A ToF sensor module 500 is positioned on mowing equipment device 902 and communicatively connected with a control unit 904 of the mowing equipment device 902. Control unit 904 is operably connected with a drivetrain 906 and work engine 908 of mowing equipment device 902 and configured to control drivetrain 906 and work engine 908 in response to output signals generated by ToF sensor module 500.

In basic operation, ToF sensor module 500 determines distance of objects (e.g., 912, 922) about ToF sensor module 500 and mowing equipment device 902. Distance data and orientation of the distance data can be analyzed at ToF sensor module 500, in an embodiment, an alert signal(s) can be generated in response to satisfaction of one or more conditions relative to the distance data and orientation. The conditions can include comparison to a primary or secondary threshold distance, as described below in one or more embodiments. In other embodiments, ToF sensor module 500 can output the determined distance data and orientation indices to a control unit 904 of mowing equipment device 902. Control unit 904 can then spatialize the output distances based on respective orientation indices and fields of view of the indices about ToF sensor module 500 (based, e.g., on angle offsets of the respective orientation indices along an arc 104, or along a latitudinal arc 604 and longitudinal arc 602, provided by a ToF sensor module). Location and orientation of objects can be compared with one or more threshold distances to determine corrective actions for mowing equipment device 902.

ToF sensor module 500 can define a direction of motion 910 based on movement of mowing equipment device 902. The direction of motion 910 can be established by drivetrain 906, in an embodiment, and output to ToF sensor module 500 from control unit 904. For instance, where drivetrain 906 is in a forward gear, control unit 904 can send a signal to ToF sensor module 500 establishing direction of motion 910 to be in front of ToF sensor module 500. Where drivetrain 906 is in a reverse gear, control unit 904 can send a signal to ToF sensor module 500 establishing direction of motion 910 to be in the rear of ToF sensor module 500 (and mowing equipment device 902). In another embodiment, ToF sensor module 500 can have a direction and orientation device (not depicted) that identifies direction of movement 910 within ToF sensor module 500. The direction and orientation device can be a global positioning system (GPS) device in one example, or similar technology.

Once direction of motion 910 is identified, ToF sensor module 500 can initialize a subset of sensor chips having fields of view within or at least partially within direction of motion 910. A second subset of sensor chips having fields of view outside (or at least partially outside) direction of motion 910 is also initialized by ToF sensor module 500. ToF sensor module 500 can further allocate a primary threshold distance 914 to the subset of sensor chips, and can allocate a secondary threshold distance 924 to the second subset of sensor chips. In various embodiments, the primary threshold distance can be larger than the secondary threshold distance (e.g., due to the motion of mowing equipment device 902 reducing a time to take corrective action to avoid an object 912). In at least one embodiment, a value of the primary threshold distance can be proportional to a speed of mowing equipment device 902. The speed can be determined by a forward gear of drivetrain 906, conveyed to ToF sensor module 500 by control unit 904, in an embodiment. In alternative embodiments, the speed can be determined by the direction and orientation device of ToF sensor module 500.

In response to detecting an object 912 within the subset of sensor chips allocated to direction of motion 910, a distance of the object 912 is compared to the primary threshold distance 914. In response to the distance of the object 912 being equal to or less than the primary threshold distance 914, ToF sensor module 500 generates an alert (e.g., an output signal) to control unit 904, causing control unit 904 to take a corrective action. In response to detecting an object 922 within the second subset of sensor chips allocated outside of direction of motion 910, a distance of object 922 is compared to the secondary threshold distance 924. In response to the distance of object 922 being equal to or less than the secondary threshold distance 924, ToF sensor module 500 generates a second alert to control unit 904, causing control unit 904 to take a second corrective action. In an embodiment(s), the second alert and second corrective action can be the same as the alert and the corrective action. In other embodiments, control unit 904 can be configured to adopt a different corrective action in response to the second alert as compared with the alert.

In a further embodiment, ToF sensor module 500 can be configured to utilize a general threshold distance (not depicted). The general threshold distance can be smaller than the primary threshold distance 914 and the secondary threshold distance 924. In response to detecting an object closer than the general threshold distance, ToF sensor module 500 can generate a third alert and provide the third alert to control unit 904. In response to the third alert, control unit can cut power to work engine 908, or stop drivetrain 906, or both, in an embodiment.

Generally, the illustrated embodiments are not provided as strict limitations on how the disclosed aspects can be practiced by one of ordinary skill in the art, but are intended to be provided as examples that can be modified, interchanged, added to or subtracted from as would be suitable to one of ordinary skill in the art. As an example, an arrangement of components depicted in one embodiment can be swapped with components depicted in another embodiment, optionally excluding some components or including other components illustrated in a third embodiment, according to design creativity of one of ordinary skill in the art. For instance, proximity sensor 600 can be arranged within an upper housing 502 and lower housing 540 modified to accommodate the shape and arrangement of sensor chips 102 in proximity sensor 600, along with suitably arranged window pairs 410, opaque window ribs 406, dual window opening frames 412, 414, microprocessor unit(s) 530 and fastening hardware 550, as suitable. As a further example, components of disclosed devices can be implemented as connected to other components rather than included within the parent device. For instance, microprocessor unit(s) 530 can be positioned external to upper housing 502 and lower housing 540 and communicatively connected to electronics 114 of sensor arc 100. Alternatively, the opposite orientation can be implemented within the scope of the disclosure: one component (e.g., sensor chips 102 of sensor arc 100) depicted separate from another component (e.g., microprocessor unit(s) 530) can be aggregated as a single component in some embodiments. Additionally, it is noted that one or more disclosed processes can be combined into a single process providing aggregate functionality. Still further, components of disclosed machines/devices/sensors/control units can also interact with one or more other components not specifically described herein but known by those of skill in the art.

Figure 10:
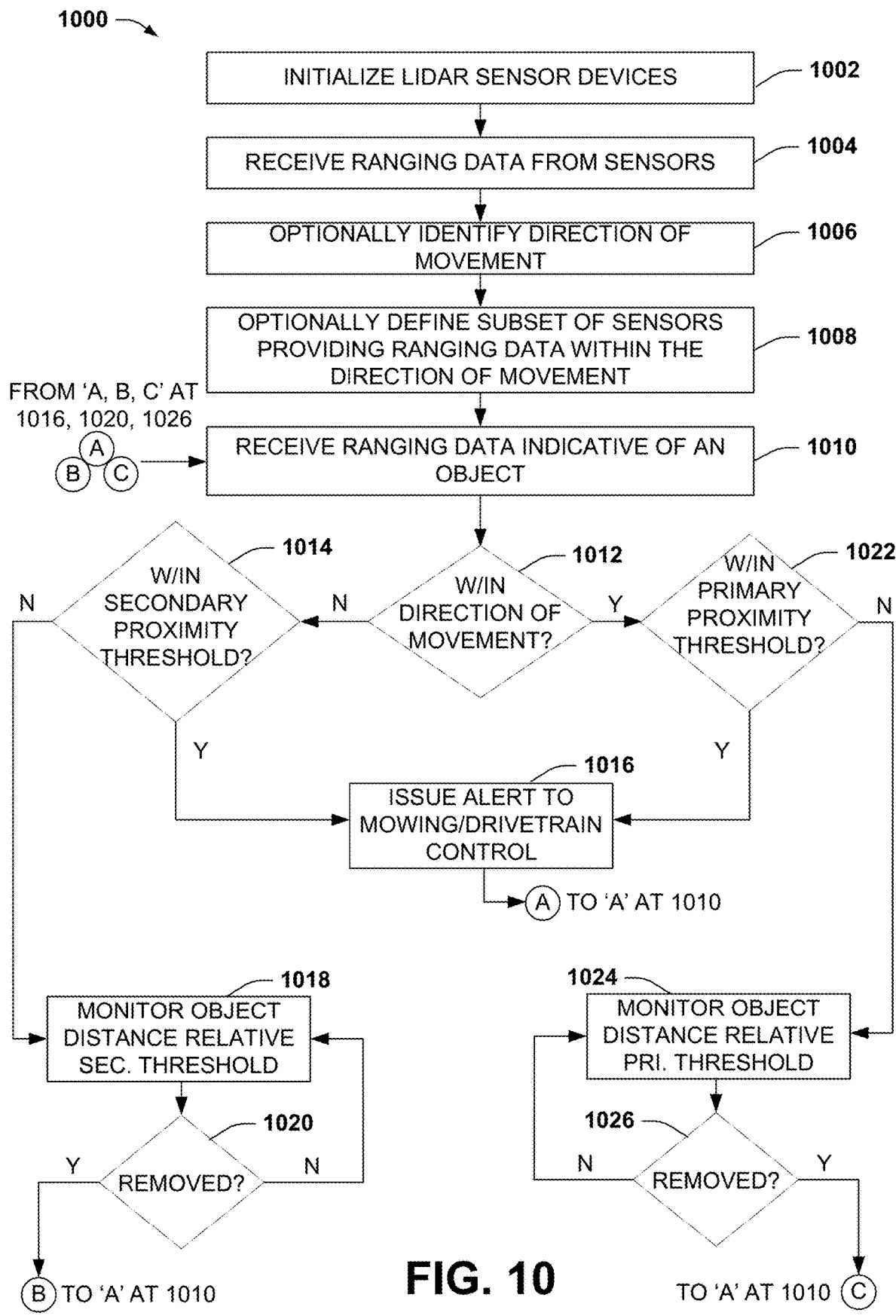
FIG. 10 depicts a diagram of an example method for operating machine vision technology in conjunction with a power equipment machine in still other embodiments.

In view of the exemplary diagrams described herein, process methods that can be implemented in accordance with the disclosed subject matter will be better appreciated with reference to the flowchart of FIG. 10. While for purposes of simplicity of explanation the method of FIG. 10 is shown and described as a series of blocks, it is to be understood and appreciated that the scope of the disclosure and the claimed subject matter is not limited by the order of the blocks, as some blocks can occur in different orders or concurrently with other blocks from what is depicted and described herein. Moreover, not all illustrated blocks are necessarily required to implement the methods described herein. Additionally, it should be further appreciated that some or all the methods disclosed throughout this specification are capable of being stored on an article of manufacture to facilitate transporting and transferring such methods to an electronic device. The term article of manufacture, where utilized, is intended to encompass a computer program accessible from any computer-readable device, device in conjunction with a carrier, or storage medium.

FIG. 10 illustrates a flowchart of a sample method 1000 according to alternative or additional embodiments of the present disclosure. At 1002, method 1000 can comprise initializing LIDAR sensor devices of a proximity sensor. The proximity sensor can be any sensor disclosed herein or known in the art, such as sensor array 100, ToF sensor module 500, or the like. Likewise, LIDAR sensor devices can include sensor chips 102. Initialization of the LIDAR sensor devices can include assigning a threshold distance to the LIDAR sensor devices, in an embodiment. In still other embodiments, initialization of the LIDAR sensor devices can include allocating a subset of sensor devices with a primary threshold distance, and allocating a second subset of sensor devices with a secondary threshold distance. In yet another embodiment, initialization of the LIDAR sensor devices can include allocating a general threshold distance to the LIDAR sensor devices, the first or second subset of the LIDAR sensor devices, either as an alternative to the primary or secondary threshold distance(s), or in conjunction there with.

At 1004, method 1000 can comprise receiving ranging data from the LIDAR sensor devices. At 1006, method 1000 can optionally comprise identifying a direction of movement of the proximity sensor and, at 1008, method 1000 can optionally comprise defining a subset of sensors providing ranging data within the direction of movement.

Further to the above, method 1000 can comprise receiving ranging data indicative of an object. At 1012, a determination can be made as to whether the object is within an identified direction of movement. If yes, method 100 can proceed to 1022. Otherwise, method 1000 proceeds to 1014.

At 1014, method 1000 can comprise determining whether the object is within a secondary proximity threshold. If the object is within the secondary proximity threshold, method 1000 can proceed to 1016, and issue an alert to mowing/drivetrain control of a power equipment machine. From reference number 1016 method 1000 can proceed to reference number 1010. If the object is not within the secondary proximity threshold, method 1000 can proceed to 1018, and can comprise monitoring object distance relative to the secondary threshold. At 1020, method 1000 can comprise determining whether the object identified at reference number 1010 leaves the field of view of the LIDAR sensor devices. If yes, method 1000 can return to 1010; if not, method 1000 can return to 1018.

At 1022, after determining the object is within the direction of movement, method 1000 can comprise determining whether the object is within the primary proximity threshold. If yes, method 1000 proceeds to 1016. Otherwise, method 1000 proceeds to 1024 and monitors the object distance relative to the primary proximity threshold. At 1026, method 1000 determines whether the object leaves the field of view of the LIDAR sensor devices. If yes, method 1000 can return to 1010; otherwise method 1000 can return to 1024.

In connection with FIG. 11, the systems and processes described below can be embodied within hardware, such as a single integrated circuit (IC) chip, multiple ICs, an application specific integrated circuit (ASIC), or the like. A suitable operating environment 1100 for implementing various aspects of the claimed subject matter includes a computer 1102. In various embodiments, a control unit of a power equipment device can be embodied in part by computer 1102, or an analogous computing device known in the art, subsequently developed, or made known to one of ordinary skill in the art by way of the context provided herein.

The computer 1102 includes a processing unit 1104, a system memory 1110, a codec 1114, and a system bus 1108. The system bus 1108 couples system components including, but not limited to, the system memory 1110 to the processing unit 1104. The processing unit 1104 can be any of various available processors. Dual microprocessors and other multiprocessor architectures also can be employed as the processing unit 1104.

The system bus 1108 can be any of several types of bus structure(s) including the memory bus or memory controller, a peripheral bus or external bus, or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 1394), and Small Computer Systems Interface (SCSI).

The system memory 1110 can include volatile memory 1110A, non-volatile memory 1110B, or both. Functions of control unit 904 described in the present specification can be programmed to system memory 1110, in various embodiments. The basic input/output system (BIOS), containing the basic routines to transfer information between elements within the computer 1102, such as during start-up, is stored in non-volatile memory 1110B. In addition, according to present innovations, codec 1114 may include at least one of an encoder or decoder, wherein the at least one of an encoder or decoder may consist of hardware, software, or a combination of hardware and software. Although, codec 1114 is depicted as a separate component, codec 1114 may be contained within non-volatile memory 1110B. By way of illustration, and not limitation, non-volatile memory 1110B can include read only memory (ROM), programmable ROM (PROM), electrically programmable ROM (EPROM), electrically erasable programmable ROM (EEPROM), or Flash memory. Non-volatile memory 1110B can be embedded memory (e.g., physically integrated with computer 1102 or a mainboard thereof), or removable memory. Examples of suitable removable memory can include a secure digital (SD) card, a compact Flash (CF) card, a universal serial bus (USB) memory stick, or the like. Volatile memory 1110A includes random access memory (RAM), which acts as external cache memory, and can also employ one or more disclosed memory architectures in various embodiments. By way of illustration and not limitation, RAM is available in many forms such as static RAM (SRAM), dynamic RAM (DRAM), synchronous DRAM (SDRAM), double data rate SDRAM (DDR SDRAM), and enhanced SDRAM (ES-DRAM), and so forth.

Computer 1102 may also include removable/non-removable, volatile/non-volatile computer storage medium. FIG. 11 illustrates, for example, disk storage 1106. Disk storage 1106 includes, but is not limited to, devices such as a magnetic disk drive, solid state disk (SSD) floppy disk drive, tape drive, Flash memory card, memory stick, or the like. In addition, disk storage 1106 can include storage medium separately or in combination with other storage medium including, but not limited to, an optical disk drive such as a compact disk ROM device (CD-ROM) or derivative technology (e.g., CD-R Drive, CD-RW Drive, DVD-ROM, and so forth). To facilitate connection of the disk storage 1106 to the system bus 1108, a removable or non-removable interface is typically used, such as interface 1112. In one or more embodiments, disk storage 1106 can be limited to solid state non-volatile storage memory, providing motion and vibration resistance for a control unit (e.g., control unit 904) operable in conjunction with a power equipment machine (e.g., power equipment machine 902).

Figure 11:
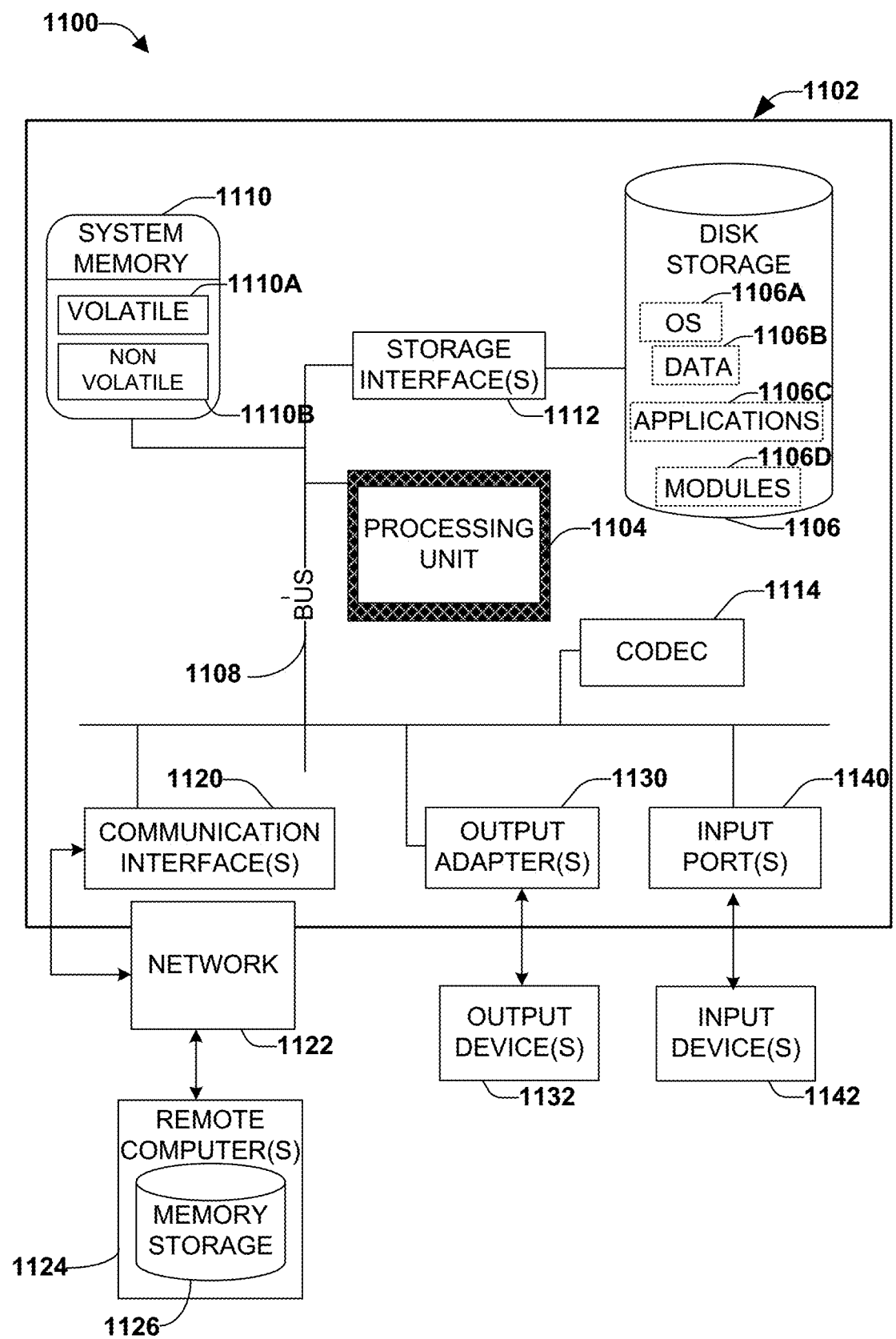
FIG. 11 depicts a diagram of an example computing environment for electronic and data management and computer control for a power equipment machine, in an embodiment.

It is to be appreciated that FIG. 11 describes software that can program computer 1102 to operate as an intermediary between an operator of a power equipment machine (e.g., power equipment machine 902), or operate as an intermediary between the power equipment machine and an autonomous control system for operating the power equipment machine embodied within operating environment 1100. Such software includes an operating system 1006A. Operating system 1106A, which can be stored on disk storage 1106, acts to control and allocate resources of the computer 1102. Applications 1106C take advantage of the management of resources by operating system 1106A through program modules 1106D, and program data 1106B, such as the boot/shutdown transaction table and the like, stored either in system memory 1110 or on disk storage 1106. It is to be appreciated that the claimed subject matter can be implemented with various operating systems or combinations of operating systems.

Input device(s) 1142 connects to the processing unit 1104 and facilitates operator interaction with operating environment 1100 through the system bus 1108 via interface port(s) 1130. Input port(s) 1140 can include, for example, a serial port, a parallel port, a game port, a universal serial bus (USB), among others. Output device(s) 1132 use some of the same type of ports as input device(s) 1142. Thus, for example, a USB port may be used to provide input to computer 1102 and to output information from computer 1102 to an output device 1132. Output adapter 1130 is provided to illustrate that there are some output devices, such as graphic display, speakers, and printers, among other output devices, which require special adapters. The output adapter 1130 can include, by way of illustration and not limitation, video and sound cards that provide a means of connection between the output device 1132 and the system bus 1108. It should be noted that other devices or systems of devices provide both input and output capabilities such as remote computer(s) 1124 and memory storage 1126.

Computer 1102 can operate in conjunction with one or more electronic devices described herein. For instance, computer 1102 can embody a control unit 904 configured to operate drivetrain 906 and work engine 908, or provide safety control for the drivetrain 906 and work engine 908. Additionally, computer 1102 can communicatively couple with ToF sensor module 500 or sensor array 100, as described in embodiments throughout the disclosure. Computer 1102 can couple with ToF sensor module 500 (embodied by remote computer(s) 1124 and memory storage 1126, in at least one embodiment) by way of a network interface 1122 in an embodiment.

Communication connection(s) 1120 refers to the hardware/software employed to connect the network interface 1122 to the system bus 1108. While communication connection 1120 is shown for illustrative clarity inside computer 1102, it can also be external to computer 1102. The hardware/software necessary for connection to the network interface 1122 includes, for exemplary purposes only, internal and external technologies such as, modems including regular telephone grade modems, cable modems and DSL modems, ISDN adapters, and wired and wireless Ethernet cards, hubs, and routers.

In regard to the various functions performed by the above described components, machines, devices, processes and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the embodiments. In this regard, it will also be recognized that the embodiments include a system as well as electronic hardware configured to implement the functions, or a computer-readable medium having computer-executable instructions for performing the acts or events of the various processes.

In addition, while a particular feature may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

In other embodiments, combinations or sub-combinations of the above disclosed embodiments can be advantageously made. The block diagrams of the architecture and flow charts are grouped for ease of understanding. However, it should be understood that combinations of blocks, additions of new blocks, re-arrangement of blocks, and the like are contemplated in alternative embodiments of the present disclosure.

It is also understood that the examples and embodiments described herein are for illustrative purposes only and that various modifications or changes in light thereof will be suggested to persons skilled in the art and are to be included within the spirit and purview of this application and scope of the appended claims.

What is claimed is:

1. A machine vision device operable in conjunction with a power equipment machine, comprising:
   a plurality of infrared sensors arranged in an arc approximately along a two dimensional or three-dimensional surface, wherein the first infrared sensor is adapted to detect presence of an object within the first field of view;
   at least one microprocessor configured to receive ranging data indicative of identified objects within respective fields of view of the plurality of infrared sensors, and determine whether the ranging data identifies an object within a threshold distance from the machine vision device;
   a housing for enclosing the plurality of infrared sensors and the at least one microprocessor, the housing having a paired window opening against which the infrared sensor is seated, the paired window opening comprising an opaque rib positioned near a center of the paired window opening and is positioned between the infrared emitter of the infrared sensor and the receiver array of the infrared sensor and flush to an active surface of the infrared sensor;
   a pair of translucent windows secured within the paired window opening of the housing at opposing sides of the opaque rib and flush to the active surface of the infrared sensor, the pair of translucent windows providing physical protection for the infrared sensor and translucent to an operating frequency of the infrared sensor; and
   a communication interface adapted to couple with an electronic control system of the power equipment machine, wherein the at least one microprocessor is configured to output an alert signal to the electronic control system of the power equipment machine in response to detecting the object within the threshold distance, wherein the alert signal is a signal output that is maintained until the object is no longer detected by the machine vision device to be within the threshold distance, and wherein the communication interface further provides periodic counter data from the at least one microprocessor in conjunction with the alert signal, the periodic counter data configured to distinguish a most recent period of the periodic counter data and of the alert signal from a previous period.

2. The machine vision device of claim 1, wherein the operating frequency of the infrared sensor is within a range from 900 nanometers (nm) to 1000 nm.

3. The machine vision device of claim 1, wherein:
   the receiver array of the infrared sensor defines a first field of view of the infrared sensor,
   the plurality of infrared sensors further comprises a second infrared sensor having a second emitter and a second receiver array defining a second field of view, and
   the second infrared sensor is adapted to detect presence of the object within the second field of view.

4. The machine vision device of claim 3, wherein the first field of view excludes the second field of view.

5. The machine vision device of claim 1, wherein the at least one microprocessor operates at a clock frequency within a range from 5 Mhz to 100 Mhz.

6. The machine vision device of claim 1, wherein the at least one microprocessor operates at a clock frequency of less than about 120 Mhz.

7. The machine vision device of claim 1, wherein the at least one microprocessor includes a set of microprocessors comprising one microprocessor for each infrared sensor of the plurality of infrared sensors, the set of microprocessors are adapted to aggregate ranging data from the plurality of infrared sensors to identify the object within any of the fields of view of the plurality of infrared sensors and output the alert signal in response to the object being within the threshold distance from the machine vision device.

8. The machine vision device of claim 7, wherein a field of view of the infrared sensor is within a direction of movement of the power equipment machine, and wherein the threshold distance for the field of view of the infrared sensor is a primary threshold distance causing the set of microprocessors to output the alert signal in response to the object within the field of view of the infrared sensor being determined by the ranging data to be at a distance equal to or less than the primary threshold distance.

9. The machine vision device of claim 8, further comprising a second infrared sensor of the plurality of infrared sensors having a second field of view outside of the direction of movement of the power equipment machine, wherein the second field of view outside of the direction of movement is associated with a secondary threshold distance, and wherein the set of microprocessors are adapted to output the alert signal in response to a second object within the second field of view being determined by the ranging data to be at a second distance equal to or less than the secondary threshold distance, wherein the primary threshold distance is larger than the secondary threshold distance.

10. The machine vision device of claim 1, further comprising a water resistant adhesive that provides a water resistance seal between the pair of translucent windows secured to the paired window opening of the housing.

11. The machine vision device of claim 1, wherein the infrared sensor is a solid-state light detection and ranging (LIDAR) sensor utilizing a time of flight calculation for determining the ranging data that identifies the object within the threshold distance.

12. The machine vision device of claim 11, wherein the threshold distance is equal to or greater than about two meters from the machine vision device.

13. The machine vision device of claim 11, wherein the threshold distance is equal to or greater than about three meters from the machine vision device.

14. The machine vision device of claim 1, wherein the arc is approximately an oval or circular arc traversing or approximately traversing at least a portion of an ovoid or circular surface circumference.

15. The machine vision device of claim 1, wherein the arc is a longitudinal arc of a spherical, ovoid or approximately spherical or ovoid surface, and further wherein the plurality of infrared sensors is arranged along the longitudinal arc and a latitudinal arc of at least a portion of the spherical, ovoid or approximately spherical or ovoid surface.

* * * * *